United States Patent
Cezanne et al.

(10) Patent No.: US 10,404,433 B2
(45) Date of Patent: Sep. 3, 2019

(54) MATRIX-BASED TECHNIQUES FOR MAPPING RESOURCE ELEMENTS TO PORTS FOR REFERENCE SIGNALS

(71) Applicant: QUALCOMM Incorporated, San Diego, CA (US)

(72) Inventors: Juergen Cezanne, Ocean Township, NJ (US); Vasanthan Raghavan, West Windsor Township, NJ (US); Bilal Sadiq, Basking Ridge, NJ (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/826,612

(22) Filed: Nov. 29, 2017

(65) Prior Publication Data

US 2018/0219660 A1    Aug. 2, 2018

Related U.S. Application Data

(60) Provisional application No. 62/452,961, filed on Jan. 31, 2017.

(51) Int. Cl.
*H04L 5/00*        (2006.01)
*H04L 27/26*      (2006.01)
(Continued)

(52) U.S. Cl.
CPC ......... *H04L 5/0048* (2013.01); *H04B 7/0408* (2013.01); *H04L 5/001* (2013.01);
(Continued)

(58) Field of Classification Search
CPC ... H04L 5/0014; H04L 5/0026; H04L 5/0048; H04W 72/04; H04B 7/0408
See application file for complete search history.

(56) References Cited

U.S. PATENT DOCUMENTS

| 8,428,168 B1 * | 4/2013 | Zhang | H04B 7/0691 375/267 |
| 10,009,084 B2 * | 6/2018 | Kim | H04B 7/0456 |

(Continued)

FOREIGN PATENT DOCUMENTS

| WO | WO-2014169418 A1 | 10/2014 |
| WO | WO-2014193475 A1 | 12/2014 |

OTHER PUBLICATIONS

3GPP 3GPP: "3rd Generation Partnership Project; Technical Specification Group Radio Access Network; Evolved Universal Terrestrial Radio Access (E-UTRA); Physical channels and modulation (Release 12)", 3GPP TS 36.211 V12.2.0 (Jun. 2014), Jun. 30, 2014 (Jun. 30, 2014), XP055358797, pp. 87-91, Retrieved from the Internet: URL: http://www.3gpp.org/ftp/Specs/archive/36_series/36.211/36211-c20.zip.

(Continued)

*Primary Examiner* — Kevin C. Harper
(74) *Attorney, Agent, or Firm* — Holland & Hart LLP

(57) ABSTRACT

Techniques are described for wireless communication. A method of wireless communication at a first wireless device includes identifying a template mapping of a plurality of ports to a first plurality of frequency subcarriers and a first plurality of time periods of a template time-frequency resource grid; mapping a plurality of resource elements of an orthogonal frequency-division multiplexing (OFDM) time-frequency resource grid to the plurality of ports based at least in part on the template mapping; receiving a reference signal from a second wireless device, on a subset of the plurality of ports, based at least in part on the mapping; and (Continued)

decoding the reference signal from a subset of the plurality of resource elements based at least in part on the mapping. In some cases, each port of the plurality of ports is associated with a corresponding radio frequency (RF) chain.

34 Claims, 18 Drawing Sheets

(51) Int. Cl.
  *H04W 72/04* (2009.01)
  *H04B 7/0408* (2017.01)
(52) U.S. Cl.
  CPC .......... *H04L 5/0007* (2013.01); *H04W 72/04* (2013.01); *H04L 5/003* (2013.01); *H04L 5/0016* (2013.01); *H04L 5/0025* (2013.01); *H04L 27/2613* (2013.01); *H04L 27/2626* (2013.01); *H04L 27/2647* (2013.01)

(56) References Cited

U.S. PATENT DOCUMENTS

| | | | | |
|---|---|---|---|---|
| 2011/0176517 A1* | 7/2011 | Hu | ......................... | H04L 5/0026 370/335 |
| 2011/0176634 A1* | 7/2011 | Yoon | ..................... | H04L 5/0023 375/295 |
| 2012/0027120 A1* | 2/2012 | Noh | ....................... | H04L 1/0026 375/295 |
| 2012/0170679 A1* | 7/2012 | Koo | ........................ | H04B 7/024 375/295 |
| 2013/0156120 A1* | 6/2013 | Josiam | ................. | H04B 7/0697 375/260 |
| 2013/0182594 A1* | 7/2013 | Kim | ..................... | H04W 72/042 370/252 |
| 2015/0003325 A1* | 1/2015 | Sajadieh | ............... | H04W 76/10 370/328 |
| 2016/0094326 A1 | 3/2016 | Moon et al. | | |
| 2017/0202014 A1* | 7/2017 | Moon | .................. | H04B 7/0626 |

OTHER PUBLICATIONS

International Search Report and Written Opinion—PCT/US2017/064013—ISA/EPO—Feb. 16, 2018 (171965WO).
Mitsubishi Electric: "Uplink DM-RS Design", 3GPP Draft; R1-100788, 3rd Generation Partnership Project (3GPP), Mobile Competence Centre, 650, Route Des Lucioles, F-06921 Sophia-Antipolis Cedex; France, vol. RAN WG1, No. Valencia, Spain; Jan. 21, 2010, XP050418404, pp. 1-4, [retrieved on Jan. 21, 2010].
Chen C-H., "Elevation Beamforming and Full-Dimension MIMO Status in 3GPP," Chunghwa Telecom, May 6, 2016, 17 pages, Retrieved from the Internet: URL: http://std-share.itri.org.tw/Content/Files/Event/Files/1.Elevation%20Beamforming%20and%20Full%20Dimension.pdf.

* cited by examiner $$P = \begin{bmatrix} 200 & 201 & 202 & 203 \\ 208 & 209 & 210 & 211 \\ 204 & 205 & 206 & 207 \\ 212 & 213 & 214 & 215 \end{bmatrix} \begin{array}{c} \text{Frequency} \\ \text{Subcarriers} \end{array} \; M$$

⟵ Time Periods ⟶

MATRIX-BASED TECHNIQUES FOR MAPPING RESOURCE ELEMENTS TO PORTS FOR REFERENCE SIGNALS

CROSS REFERENCES

The present Application for Patent claims priority to U.S. Provisional Patent Application No. 62/452,961 by Cezanne, et al., entitled "Matrixed-Based Techniques For Mapping Resource Elements to Ports For Reference Signals," filed Jan. 31, 2017, assigned to the assignee hereof.

BACKGROUND

Field of the Disclosure

The present disclosure, for example, relates to wireless communication systems, and more particularly to matrix-based techniques for mapping resource elements to ports for reference signals.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) wireless communication system, a network access device may take the form of a base station, with a set of one or more base stations defining an eNodeB (eNB). In a next generation, new radio (NR), millimeter wave (mmW), or 5G wireless communication system, a network access device may take the form of a smart radio head (or radio head (RH)) or access node controller (ANC), with a set of smart radio heads in communication with an ANC defining a gNodeB (gNB). A network access device may communicate with a set of UEs on downlink channels (e.g., for transmissions from a network access device to a UE) and uplink channels (e.g., for transmissions from a UE to a network access device).

In some cases, a network access device may transmit a reference signal. A reference signal may be broadcast to all UEs. The reference signal may additionally or alternatively be transmitted to one UE or a subset of UEs. It is important that a reference signal be transmitted with a predetermined mapping of resource elements to ports (e.g., radio frequency (RF) chains). The predetermined mapping of resource elements may be distributed in both time and frequency.

SUMMARY

In one example, a method of wireless communications at a first wireless device is described. The method may include identifying a template mapping of a plurality of ports to a first plurality of frequency subcarriers and a first plurality of time periods of a template time-frequency resource grid, mapping a plurality of resource elements of an orthogonal frequency-division multiplexing (OFDM) time-frequency resource grid to the plurality of ports based at least in part on the template mapping, receiving a reference signal from a second wireless device, on a subset of the plurality of ports, based on the mapping, and decoding the reference signal from a subset of the plurality of resource elements based at least in part on the mapping. In some cases, each port of the plurality of ports is associated with a corresponding radio frequency (RF) chain.

In one example, an apparatus for wireless communications at a first wireless device is described. The apparatus may include means for identifying a template mapping of a plurality of ports to a first plurality of frequency subcarriers and a first plurality of time periods of a template time-frequency resource grid; means for mapping a plurality of resource elements of an OFDM time-frequency resource grid to the plurality of ports based at least in part on the template mapping; means for receiving a reference signal from a second wireless device, on a subset of the plurality of ports, based at least in part on the mapping; and means for decoding the reference signal from a subset of the plurality of resource elements based at least in part on the mapping. In some cases, each port of the plurality of ports is associated with a corresponding RF chain.

In one example, another apparatus for wireless communications at a first wireless device is described. The apparatus may include a processor, memory in electronic communication with the processor, and instructions stored in the memory. The instructions may be operable, when executed by the processor, to cause the apparatus to identify a template mapping of a plurality of ports to a first plurality of frequency subcarriers and a first plurality of time periods of a template time-frequency resource grid; map a plurality of resource elements of an OFDM time-frequency resource grid to the plurality of ports based at least in part on the template mapping; receive a reference signal from a second wireless device, on a subset of the plurality of ports, based at least in part on the mapping; and decode the reference signal from a subset of the plurality of resource elements based at least in part on the mapping. In some cases, each port of the plurality of ports is associated with a corresponding RF chain.

In one example, a non-transitory computer-readable medium storing computer-executable code for wireless communication at a first wireless device is described. The code may be executable to identify a template mapping of a plurality of ports to a first plurality of frequency subcarriers and a first plurality of time periods of a template time-frequency resource grid; map a plurality of resource elements of an OFDM time-frequency resource grid to the plurality of ports based at least in part on the template mapping; receive a reference signal from a second wireless device, on a subset of the plurality of ports, based at least in part on the mapping; and decode the reference signal from a subset of the plurality of resource elements based at least in part on the mapping. In some cases, each port of the plurality of ports is associated with a corresponding RF chain.

Some examples of the method, apparatus, and non-transitory computer-readable medium described above may further include processes, features, means, instructions, or code for receiving a plurality of reference signals, including the reference signal, from the second wireless device, on a plurality of subsets of the plurality of ports, based at least in part on the mapping. In some examples, the plurality of reference signals may be received using a receive beam sweep in time and frequency.

In some examples of the method, apparatus, and non-transitory computer-readable medium described above, the subset of the plurality of resource elements may be distributed in time and frequency over the OFDM time-frequency resource grid.

In some examples of the method, apparatus, and non-transitory computer-readable medium described above, the mapping may include mapping each resource element of the plurality of resource elements to a single port of the plurality of ports based at least in part on the template mapping. In some examples, the mapping may include mapping each resource element of the plurality of resource elements to a group of ports of the plurality of ports, based at least in part on an orthogonal cover code (OCC) associated with the template mapping. In some examples, a number of ports in the group of ports may be based at least in part on a length of the OCC.

Some examples of the method, apparatus, and non-transitory computer-readable medium described above may further include processes, features, means, instructions, or code for applying an OCC to at least one group of resource elements of the plurality of resource elements. The application of the OCC to a group of resource elements may map each resource element in the group of resource elements to a group of ports, with the group of ports being associated with the group of resource elements by the mapping of the plurality of resource elements to the plurality of ports.

In some examples of the method, apparatus, and non-transitory computer-readable medium described above, the OFDM time-frequency resource grid may include at least one of a second plurality of frequency subcarriers greater in number than the first plurality of frequency subcarriers, a second plurality of time periods greater in number than the first plurality of time periods, or a combination thereof.

In one example, another method of wireless communications at a first wireless device is described. The method may include identifying a template mapping of a plurality of ports to a first plurality of frequency subcarriers and a first plurality of time periods of a template time-frequency resource grid; mapping a plurality of resource elements of an OFDM time-frequency resource grid to the plurality of ports based at least in part on the template mapping; mapping a reference signal to a subset of the plurality of resource elements based at least in part on the mapping of the plurality of resource elements to the plurality of ports; and transmitting the mapped reference signal to at least a second wireless device, from a subset of the plurality of ports, based at least in part on the mapping of the plurality of resource elements to the plurality of ports and the mapping of the reference signal to the subset of the plurality of resource elements. In some cases, each port of the plurality of ports may be associated with a corresponding RF chain.

In one example, another apparatus for wireless communications at a first wireless device is described. The apparatus may include means for identifying a template mapping of a plurality of ports to a first plurality of frequency subcarriers and a first plurality of time periods of a template time-frequency resource grid; means for mapping a plurality of resource elements of an OFDM time-frequency resource grid to the plurality of ports based at least in part on the template mapping; means for mapping a reference signal to a subset of the plurality of resource elements based at least in part on the mapping of the plurality of resource elements to the plurality of ports; and means for transmitting the mapped reference signal to at least a second wireless device, from a subset of the plurality of ports, based at least in part on the mapping of the plurality of resource elements to the plurality of ports and the mapping of the reference signal to the subset of the plurality of resource elements. In some cases, each port of the plurality of ports may be associated with a corresponding RF chain.

In one example, another apparatus for wireless communications at a first wireless device is described. The apparatus may include a processor, memory in electronic communication with the processor, and instructions stored in the memory. The instructions may be operable, when executed by the processor, to cause the apparatus to identify a template mapping of a plurality of ports to a first plurality of frequency subcarriers and a first plurality of time periods of a template time-frequency resource grid; map a plurality of resource elements of an OFDM time-frequency resource grid to the plurality of ports based at least in part on the template mapping; map a reference signal to a subset of the plurality of resource elements based at least in part on the mapping of the plurality of resource elements to the plurality of ports; and transmit the mapped reference signal to at least a second wireless device, from a subset of the plurality of ports, based at least in part on the mapping of the plurality of resource elements to the plurality of ports and the mapping of the reference signal to the subset of the plurality of resource elements. In some cases, each port of the plurality of ports may be associated with a corresponding RF chain.

In one example, another non-transitory computer-readable medium storing computer-executable code for wireless communication at a first wireless device is described. The code may be executable to identify a template mapping of a plurality of ports to a first plurality of frequency subcarriers and a first plurality of time periods of a template time-frequency resource grid; map a plurality of resource elements of an OFDM time-frequency resource grid to the plurality of ports based at least in part on the template mapping; map a reference signal to a subset of the plurality of resource elements based at least in part on the mapping of the plurality of resource elements to the plurality of ports; and transmit the mapped reference signal to at least a second wireless device, from a subset of the plurality of ports, based at least in part on the mapping of the plurality of resource elements to the plurality of ports and the mapping of the reference signal to the subset of the plurality of resource elements. In some cases, each port of the plurality of ports may be associated with a corresponding RF chain.

Some examples of the method, apparatus, and non-transitory computer-readable medium described above may further include processes, features, means, instructions, or code for mapping a plurality of reference signals including the reference signal to a plurality of subsets of the plurality of resource elements based at least in part on the mapping of the plurality of resource elements to the plurality of ports. In some examples, the method, apparatus, and non-transitory computer-readable medium may further include processes, features, means, instructions, or code for transmitting the mapped plurality of reference signals to at least the second wireless device, from a plurality of subsets of the plurality of ports, based at least in part on the mapping of the plurality of resource elements to the plurality of ports and the mapping of the reference signal to the subset of the plurality of resource elements. In some examples, the mapped plurality of reference signals may be transmitted using a transmit beam sweep in time and frequency.

In some examples of the method, apparatus, and non-transitory computer-readable medium described above, the subset of the plurality of resource elements may be distributed in time and frequency over the OFDM time-frequency resource grid.

In some examples of the method, apparatus, and non-transitory computer-readable medium described above, the mapping of the plurality of resource elements to the plurality of ports may include mapping each resource element of the plurality of resource elements to a single port of the plurality of ports based at least in part on the template mapping. In some examples, the mapping of the plurality of resource elements to the plurality of ports may include mapping each resource element of the plurality of resource elements to a group of ports of the plurality of ports, based at least in part on an OCC associated with the template mapping. In some examples, a number of ports in the group of ports may be based at least in part on a length of the OCC.

Some examples of the method, apparatus, and non-transitory computer-readable medium described above may further include processes, features, means, instructions, or code for applying an OCC to at least one group of resource elements of the plurality of resource elements. The application of the OCC to a group of resource elements may map each resource element in the group of resource elements to a group of ports, with the group of ports being associated with the group of resource elements by the mapping of the plurality of resource elements to the plurality of ports.

In some examples of the method, apparatus, and non-transitory computer-readable medium described above, the OFDM time-frequency resource grid may include at least one of a second plurality of frequency subcarriers greater in number than the first plurality of frequency subcarriers, a second plurality of time periods greater in number than the first plurality of time periods, or a combination thereof.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 shows a template matrix that may be used to map resource elements to ports, in accordance with various aspects of the present disclosure;

DETAILED DESCRIPTION

A portion of next generation, NR, or 5G wireless communication systems will be based on millimeter wave communication. Millimeter wave communication is expected to provide very high data rates at ultra-low latencies. Beamforming is expected to be used to overcome the poor link margins that are typically associated with mmW communication. Beamforming, and particularly the sweeping of beams by both network access devices and UEs, may use reference signals allocated in time and frequency. Pre-5G wireless communication systems have provided for the transmission of reference signals for beam sweeps based on a time-based mapping or frequency-based mapping of resource elements to ports. More specifically, prior to NR, each antenna port have been allocated to a resource block. However, with the advent of millimeter wave communication, a large number of antennas and a smaller number of RF chains are available for communication. As a result, an RF chain may be mapped to an antenna port in order to effectively communicate using millimeter wave communication. The present disclosure describes matrix-based techniques for mapping resource elements to ports for reference signals. Depending on implementation, the matrix-based techniques can minimize the overhead needed to map resource elements to ports, facilitate simultaneous sweeping of transmit beams (by a network access device) and receive beams (by a UE), and provide for independent mapping periodicities in time and frequency.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples.

Figure 1:
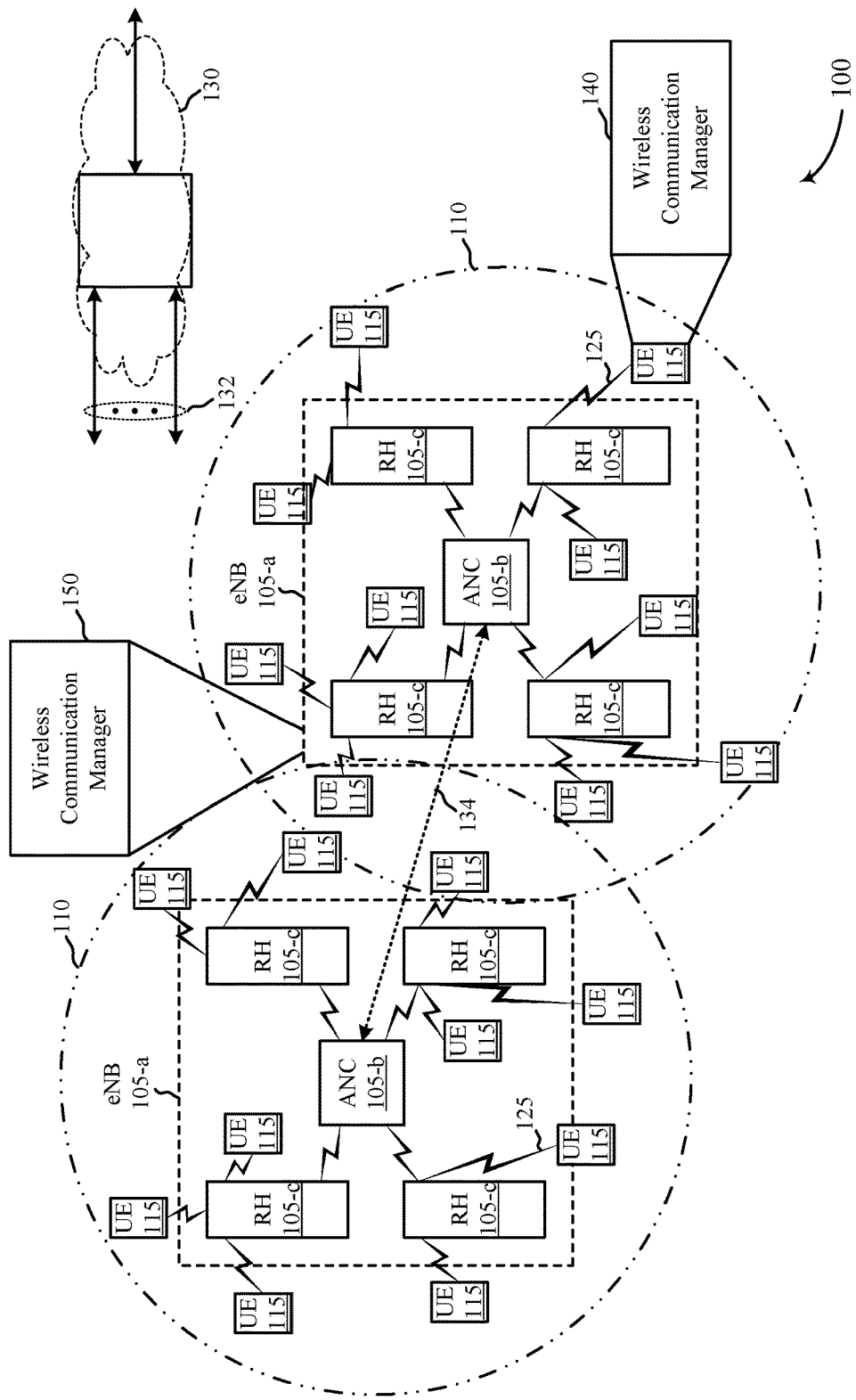
FIG. 1 shows an example of a wireless communication system, in accordance with various aspects of the present disclosure.

FIG. 1 shows an example of a wireless communication system 100, in accordance with various aspects of the present disclosure. The wireless communication system 100 may include network access devices 105 (e.g., gNBs 105-a, ANCs 105-b, and/or RHs 105-c), UEs 115, and a core network 130. The core network 130 may provide user authentication, access authorization, tracking, IP connectivity, and other access, routing, or mobility functions. At least some of the network access devices 105 (e.g., gNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may additionally or alternatively communicate with a number of UEs 115 through a number of smart radio heads (e.g., RHs 105-c). In an alternative configuration of the wireless communication system 100, the functionality of an ANC 105-b may be provided by a radio head 105-c or distributed across the radio heads 105-c of an gNB 105-a. In another alternative configuration of the wireless communication system 100 (e.g., an LTE/LTE-A configuration), the radio heads 105-c may be replaced with base stations, and the ANCs 105-b may be replaced by base station controllers (or links to the core network 130). In some examples, the wireless communication system 100 may include a mix of radio heads 105-c, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communication system 100 may support synchronous or asynchronous operation. For synchronous operation, the gNBs 105-a and/or radio heads 105-c may have similar frame timing, and transmissions from different gNBs 105-a and/or radio heads 105-c may be approximately aligned in time. For asynchronous operation, the gNBs 105-a and/or radio heads 105-c may have different frame timings, and transmissions from different gNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A RLC layer may in some cases perform packet segmentation and reassembly to communicate over logical channels. A Media Access Layer (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of gNBs 105-a, radio heads 105-c, base stations, access points, or other network access devices, including macro gNBs, small cell gNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a radio head 105-c, and/or downlinks (DLs), from a radio head 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using time-division multiplexing (TDM) techniques, frequency-division multiplexing (FDM) techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for frequency division duplex (FDD) (e.g., frame structure type 1) and time division duplex (TDD) (e.g., frame structure type 2) may be defined.

In some examples of the wireless communication system 100, network access devices 105 (e.g., radio heads 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, a UE 115 may include a wireless communication manager 140, or a network access device 105 may include a wireless communication manager 150. In some examples, the wireless communication manager 140 or 150 may be used to identify a template mapping of a plurality of ports to a first plurality of frequency subcarriers and a first plurality of time periods of a template time-frequency resource grid; map a plurality of resource elements of an OFDM time-frequency resource grid to the plurality of ports based at least in part on the template mapping; receiving a reference signal from a second wireless device, on a subset of the plurality of ports, based at least in part on the mapping; and decode the reference signal from a subset of the plurality of resource elements based at least in part on the mapping, as described for example with reference to FIGS. 3-8 and 13-15. In some examples, the wireless communication manager 140 or 150 may additionally or alternatively be used to identify a template mapping of a plurality of ports to a first plurality of frequency subcarriers and a first plurality of time periods of a template time-frequency resource grid; map a plurality of resource elements of an OFDM time-frequency resource grid to the plurality of ports based at least in part on the template mapping; map a reference signal to a subset of the plurality of resource elements based at least in part on the mapping of the plurality of resource elements to the plurality of ports; and transmit the mapped reference signal to at least a second wireless device, from a subset of the plurality of ports, based at least in part on the mapping of the plurality of resource elements to the plurality of ports and the mapping of the reference signal to the subset of the plurality of resource elements.

Figure 2:
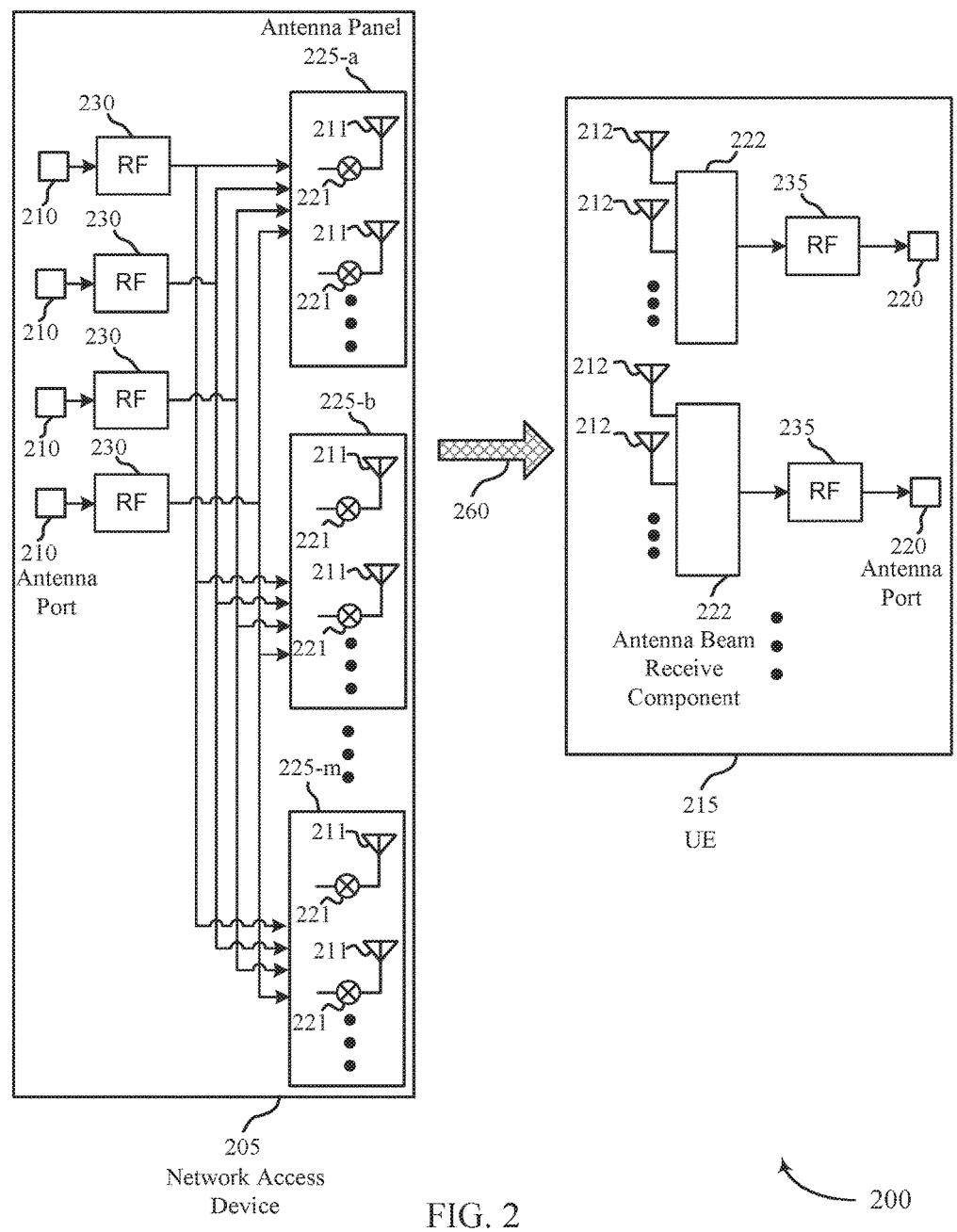
FIG. 2 shows an example of a wireless communication system including a network access device and a UE, in accordance with various aspects of the present disclosure.

FIG. 2 shows an example of a transmission diagram 200 including a network access device 205 and a UE 215, in accordance with various aspects of the present disclosure. The network access device 205 and UE 215 may be examples of aspects of the network access devices and UEs described with reference to FIG. 1. In transmission diagram 200, network access device 205 includes multiple antenna ports 210, where each antenna port 210 is associated with a single RF transmit chain 230. Each antenna port 210 may be coupled with multiple physical antennas 211. The physical antennas may be arranged in antenna panels 225, where each antenna panel 225 may include multiple physical antennas 211. Each antenna panel 225 may be capable of implementing one or more antenna configurations. Each antenna configuration may be referred to as a beam. Each antenna panel 225 may be single polarized or dual polarized. In some examples, the network access device may include M antenna panels 225 (e.g., antenna panels 225-a, 225-b, . . . , 225-m), where each antenna panel 225 includes N physical antennas 211. The distance between the physical antennas 211 of an antenna panel 225 may be less than $\lambda/2$, where $\lambda$ describes the shortest working wavelength of the transmitter. Each antenna panel 225 may be configured to have its own ability to perform phase offsets for the antennas in that antenna panel (e.g., phase shifters 221) to generate a beam with selectable beam direction and/or beam width from one of the antenna ports 210. Each RF transmit chain 230 may include digital processing capability for an RF signal, and may generate an analog RF output signal (e.g., via a digital-to-analog converter (DAC)) to transmit via one or more antenna panels 225. In some cases, different antenna panels 225 associated with a common antenna port 210 may transmit at different frequencies and in different directions. As an example, the outputs of physical antennas 211 may form a transmit beam 260. When transmitting, the network access device 205 may map a transmission (e.g., a control channel, data channel, or reference signal) to a number of resource elements distributed in time and/or frequency, and transmit the transmission from a number of ports 210 mapped to the resource elements.

UE 215 may include multiple physical antennas 212 and multiple antenna ports 220. The physical antennas 212 may be grouped, where signals from each group are combined in an antenna beam receive component 222. For example, each antenna beam receive component 222 may be an analog combiner that combines signals from multiple physical antennas 212 in the analog domain. The combined signal may be processed by an RF chain 235 for reception via an antenna port 220. Thus, each antenna port 220 may be associated with one RF chain 235 and be capable of receiving a composite beam transmitted from one or more antenna panels 225 of the network access device 205. Although illustrated with two antenna ports 220, a UE may have only one, or more than two antenna ports 220. When receiving, the UE 215 may receive a transmission mapped to a number of resource elements distributed in time and/or frequency (e.g., a control channel, data channel, or reference signal) on a composite beam via and antenna port, and decode received symbols of the transmission from the number of resource elements. In some examples, the resource element to port mapping may be based on a template matrix (or template mapping), as described with reference to FIGS. 3 and 4.

FIG. 3 shows a template matrix 300 that may be used to map resource elements to ports, in accordance with various aspects of the present disclosure. The template matrix, P, provides a template mapping of ports (e.g., 16 ports numbered 200, 201, . . . 214, 215) to M subcarriers (e.g., 4 subcarriers) and N time periods (e.g., 4 OFDM symbol periods) of a template time-frequency resource grid. In the example of FIG. 3, the template matrix P is a 2-dimensional 4×4 matrix. The first dimension (e.g., shown horizontally in FIG. 3) may indicate time periods used to map the plurality of ports and the second dimension (e.g., shown vertically in FIG. 3) may indicate frequency resources used to map the ports. In some cases, the template matrix P may be associated with a plurality of RF chains scanning over different symbols. In this example, the template matrix P is associated with 4 RF chains scanning over 4 different symbols. In some examples, each column of the template matrix P may be associated with a separate UE (such as UE 115). For example, the ports 200, 208, 204 and 212 may be used to scan 4 different beams associated with a particular UE. Similarly, the ports 201, 209, 205 and 213 may be used to scan different beams for a second UE, the ports 202, 210, 206 and 214 may be used to scan different beams for a third UE, and the ports 203, 211, 207 and 215 may be used to scan different beams for a fourth UE. In some examples, a base station (e.g., network access device 105) may be configured to allocate resources to 4 different beams directed to 4 different UEs over 4 different time periods. In some examples, the base station (e.g., network access device 105) may allocate additional frequency resources to repeat the template matrix P in the frequency dimension, and additional repetitions of the template matrix may be associated with different antenna panels. The base station may allocate additional time resources to repeat the template matrix P in the time dimension to vary the beam directions associate with each antenna port for a given panel. Repetition of the template matrix P is described in more detail with reference to FIG. 4. It should be understood that the template matrix P may be mapped to contiguous or non-contiguous resources within a set of time-frequency resources. For example, every other, every third, or every fourth subcarrier may be used for transmitting reference signals via the antenna ports, and the template matrix P may be mapped to the reference signal resource elements.

Figure 4:
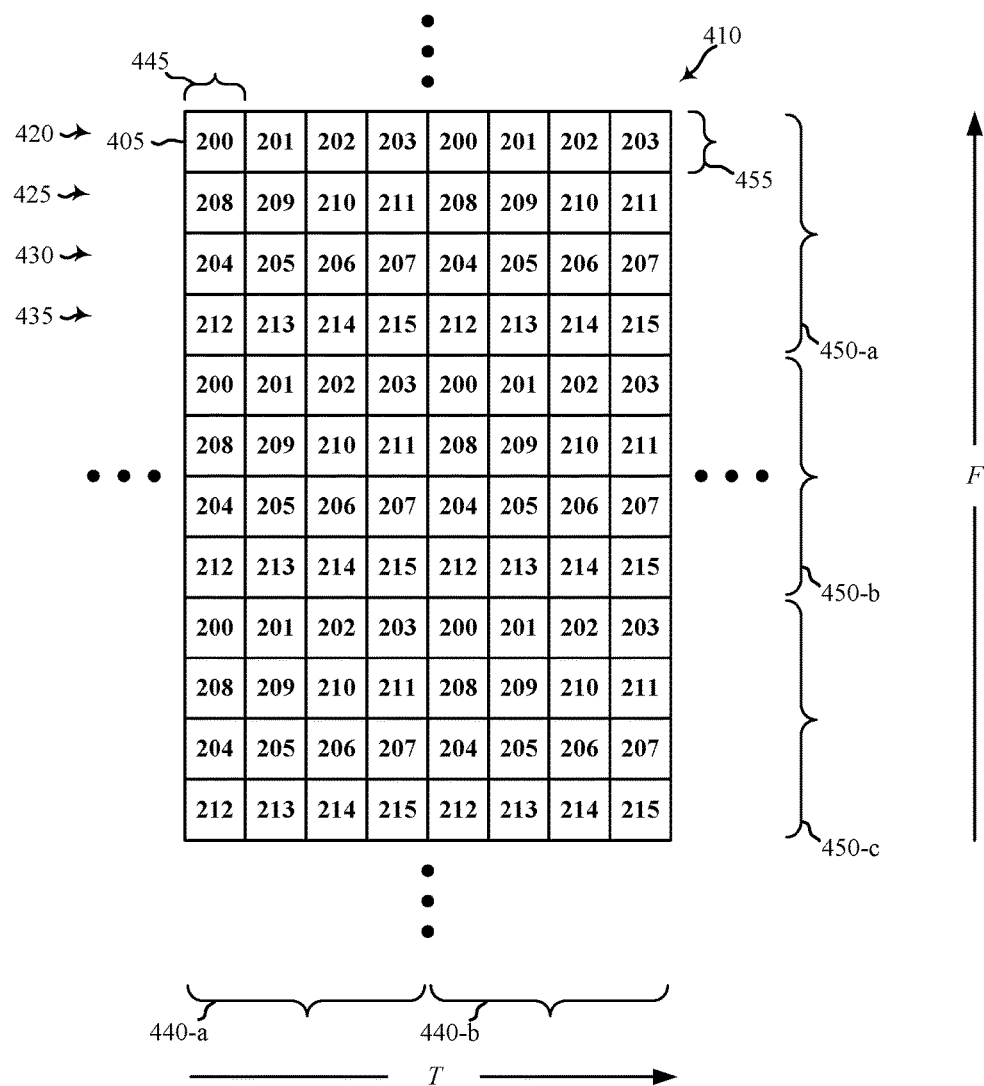
FIG. 4 shows a mapping of resource elements to ports, in accordance with various aspects of the present disclosure.

FIG. 4 shows a mapping 400 of resource elements to ports, in accordance with various aspects of the present disclosure. Each resource element 405 is defined by an intersection of a frequency subcarrier 455 and a time period 445 (e.g., an OFDM symbol period) in an OFDM time-frequency resource grid 410. By way of example, the OFDM time-frequency resource grid 410 shown in FIG. 4 includes (or spans) F subcarriers 455 (e.g., 12 subcarriers) and T time periods 445 (e.g., 8 OFDM symbol periods). Thus, the OFDM time-frequency resource grid 410 includes 96 resource elements 405.

The resource mapping 400 shows the mapping of a plurality of ports (e.g., 16 ports numbered 200, 201, . . . 214, 215) to the elements 405 using a template mapping, such as the template mapping provided by the template matrix, P, described with reference to FIG. 3. In some cases, the template matrix P may be repeated over time and frequency resources. Based on the M×N template matrix P, the resource element (k, l) may be mapped to a port number port(k, l) of the template matrix P based on the rule:

$$\text{port}(k,l)=P(k \bmod M, l \bmod N),$$

where k is the k-th subcarrier frequency of the OFDM time-frequency resource grid 410, l is the l-th time period of the OFDM time-frequency resource grid 410, $0 \le k \le F-1$, and $0 \le l \le T-1$.

The numbers of the ports mapped to each of the resource elements 405 are noted within each resource element 405. In some examples, transmitting and receiving devices may be configured with a plurality of template matrices, and may select a template matrix for use based on various parameters.

In some examples, one or more reference signals may be mapped to the resource elements 405 based at least in part on the mapping 400. In one example, the first row 420 of resource elements 405 shown in FIG. 4 may be mapped to ports 200-203, the second row 425 of resource elements 405 may be mapped to ports 208-211, the third row 430 of resource elements 405 may be mapped to ports 204-207, and the fourth row 435 of resource elements 405 may be mapped to ports 212-215. In some cases, different instances of the template matrix P may be associated with different beam directions for the antenna ports. For example, the template matrix P for a first set of subcarriers 450-a and a first set of time periods 440-a may be associated with a first beam direction for a first antenna panel. Additional instances of the template matrix P may be associated with different beam directions for the first antenna panel or different antenna panels. For example, for additional sets of time periods 440, the template matrix P may be mapped to the same antenna panel using different beam directions. Thus, the instance of the template matrix P for the first set of subcarriers 450-a and a second set of time periods 440-b may also be transmitted via the first antenna panel, but with different beam directions. The instance of the template matrix P for a second set of subcarriers 450-b and the first set of time periods 440-a may be transmitted via a second antenna panel. The instance of the template matrix P for a third set of subcarriers 450-c and the first set of time periods 440-a may be transmitted via a third antenna panel. In some examples, different ports may be allocated to different polarizations (e.g., orthogonal polarizations)

In some examples, each antenna port may be associated with a corresponding RF chain at the transmitter. In some examples, each antenna port may also be associated with a corresponding RF chain at the receiver. Thus, a receiver may receive a composite beam over a given antenna port (e.g., antenna port 200) in a given symbol period via one RF chain that may be coupled with one or more physical antennas (e.g., via an analog combiner). For example, a receiver may have four receive antenna ports used for receiving transmission via antenna ports 200, 208, 204, and 212, respectively. In some examples, the receiver may not be able to distinguish between the directions within the composite beam (e.g., because of analog combining for a given antenna port). The transmitter may transmit the template matrix P over five sets of time periods 440, with each port being a composite of three beams (via the three antenna panels). Thus, the transmitter may transmit a total of 15 beams over the five sets of time periods 440 via each antenna port. The receiver may detect the energy of each composite beam and report the composite beam having the highest detected energy. The transmitter may then pursue finer beam refinement to select one or more beams from the identified composite beam for transmissions to the receiver.

In the mapping 400, each resource element is mapped to a single port. At times, it may be useful to map a resource element to a linear combination of L ports, where L>1. In some examples, a resource element may be mapped to L ports using an orthogonal cover code (OCC) of length L bits, as shown in FIG. 5.

Figure 5:
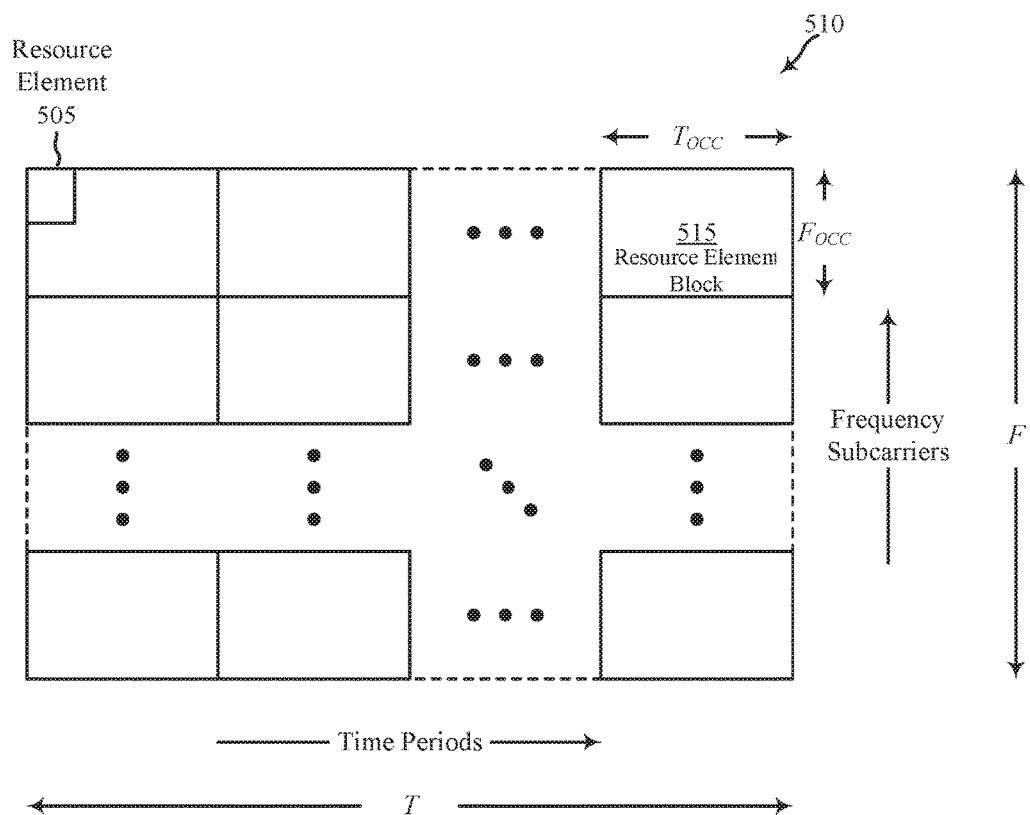
FIG. 5 shows a mapping of resource elements to ports based on an OCC, in accordance with various aspects of the present disclosure.

FIG. 5 shows a mapping 500 of resource elements to ports based on an OCC, in accordance with various aspects of the present disclosure. Each resource element 505 is defined by an intersection of a frequency subcarrier and a time period (e.g., an OFDM symbol period) in an OFDM time-frequency resource grid 510. By way of example, the OFDM time-frequency resource grid 510 shown in FIG. 5 includes (or spans) a plurality of F frequency subcarriers and a plurality of T time periods.

Each resource element 505 in the OFDM time-frequency resource grid 510 may be mapped to a group of ports of a plurality of ports based on an OCC having a length of L bits. In some examples, the OFDM time-frequency resource grid 510 may be divided into a plurality of disjoint (non-overlapping) resource element blocks 515 having dimensions of $F_{OCC}$ frequency subcarriers and $T_{OCC}$ time periods, with each of $F_{OCC}$ and $T_{OCC}$ being equal to or greater than one, with at least one of $F_{OCC}$ or $T_{OCC}$ being greater than one, and with each resource element block 515 including L resource elements 505 (i.e., the area of each resource element block $R_{OCC}=F_{OCC} \times T_{OCC}=L$). Each resource element 505 within a resource element block 515 may be mapped to each of the L ports (i.e., to all ports in the set of ports $P=\{p_0, \ldots, p_{L-1}\}$) by the OCC.

In some examples, the OCC may be associated with a template mapping of ports to frequency subcarriers and time periods (e.g., the template matrix P described with reference to FIG. 3). In other examples, the OCC may be applied to groups of resource elements independently of a template mapping of ports to frequency subcarriers and time periods. That is, one or both of the dimensions of a group of resource blocks may differ from one or more of the corresponding dimensions of a template matrix, P, such that $F_{OCC} \times T_{OCC} \neq M \times N$. In some examples, different OCCs may be applied to different groups of resource elements.

Figure 6:
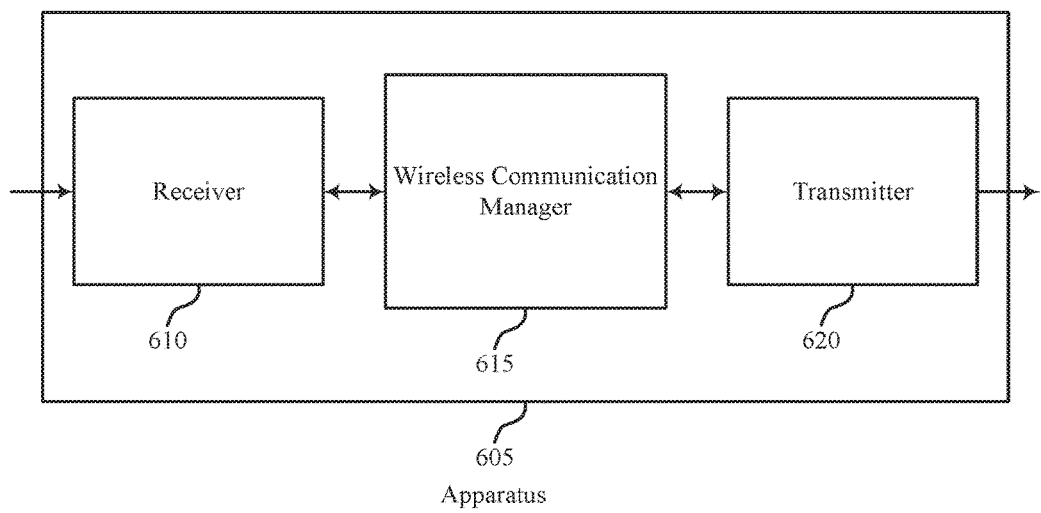
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of a UE or network access device described with reference to FIGS. 1 and 2. The apparatus 605 may include a receiver 610, a wireless communication manager 615, and a transmitter 620. The apparatus 605 may also include a processor. Each of these components may be in communication with one another (e.g., via one or more buses).

The receiver 610 may receive data or control signals or information (i.e., transmissions), some or all of which may be associated with various information channels (e.g., data channels, control channels, etc.). Received signals or information, or measurements performed thereon, may be passed to other components of the apparatus 605. The receiver 610 may include a single antenna or a set of antennas.

The wireless communication manager 615 and/or at least some of its various sub-components may be implemented in hardware, software executed by a processor, firmware, or any combination thereof. If implemented in software executed by a processor, the functions of the wireless communication manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The wireless communication manager 615 and/or at least some of its various sub-components may be physically located at various positions, including being distributed such that portions of functions are implemented at different physical locations by one or more physical devices. In some examples, the wireless communication manager 615 and/or at least some of its various sub-components may be a separate and distinct component in accordance with various aspects of the present disclosure. In other examples, the wireless communication manager 615 and/or at least some of its various sub-components may be combined with one or more other hardware components, including but not limited to an I/O component, a transceiver, another computing device, one or more other components described in the present disclosure, or a combination thereof in accordance with various aspects of the present disclosure. The wireless communication manager 615 may be an example of aspects of the wireless communication managers described with reference to FIG. 1.

The wireless communication manager 615 may be used to manage one or more aspects of wireless communications for the apparatus 605, and may be used to identify a template mapping of a plurality of ports to a first plurality of frequency subcarriers and a first plurality of time periods of a template time-frequency resource grid, to map a plurality of resource elements of an OFDM time-frequency resource grid to the plurality of ports based at least in part on the template mapping, and to transmit or receive reference signals based on the mapping. In some cases, each port of the plurality of ports is associated with a corresponding RF chain.

The transmitter 620 may transmit data or control signals or information (i.e., transmissions) generated by other components of the apparatus 605, some or all of which may be associated with various information channels (e.g., data channels, control channels, etc.). In some examples, the transmitter 620 may be collocated with the receiver 610 in a transceiver. For example, the transmitter 620 and receiver 610 may be an example of aspects of the transceiver 1130 or 1250 described with reference to FIG. 11 or 12. The transmitter 620 may include a single antenna or a set of antennas.

Figure 7:
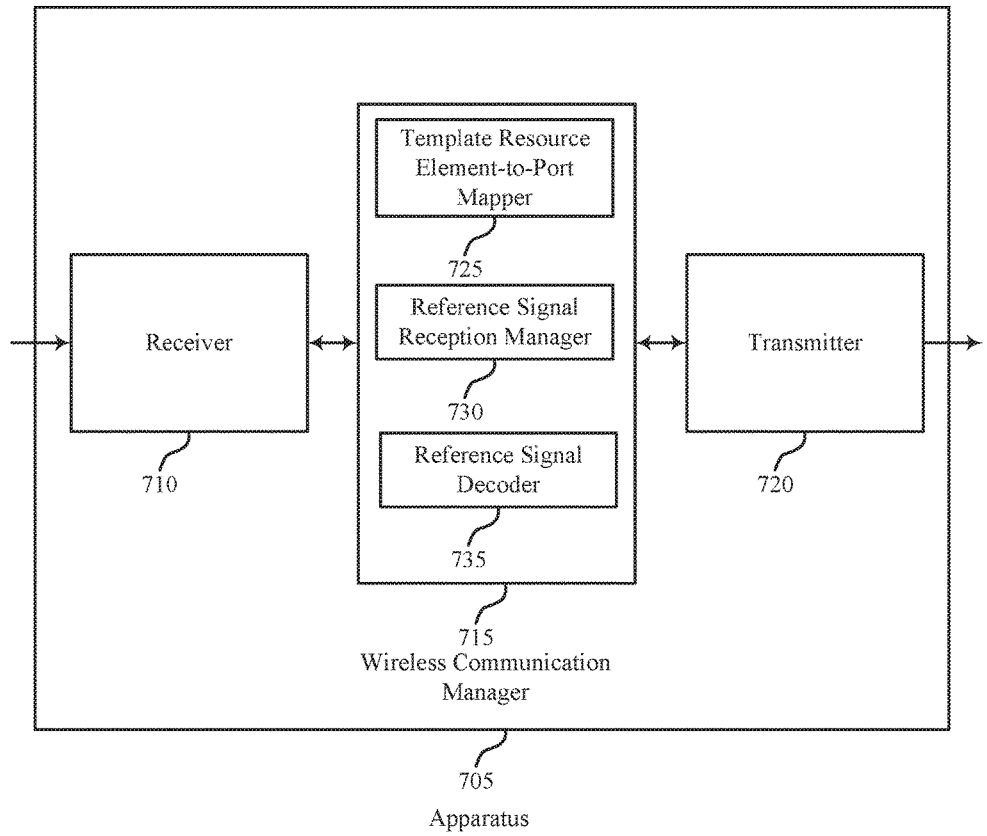
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of a UE or apparatus described with reference to FIGS. 1, 2, and 6. The apparatus 705 may include a receiver 710, a wireless communication manager 715, and a transmitter 720. The apparatus 705 may also include a processor. Each of these components may be in communication with one another (e.g., via one or more buses).

The receiver 710 may receive data or control signals or information (i.e., transmissions), some or all of which may be associated with various information channels (e.g., data channels, control channels, etc.). Received signals or information, or measurements performed thereon, may be passed to other components of the apparatus 705. The receiver 710 may include a single antenna or a set of antennas.

The wireless communication manager 715 may include a template resource element-to-port mapper 725, a reference signal reception manager 730, and a reference signal decoder 735. The wireless communication manager 715 may be an example of aspects of a wireless communication manager included in a UE, as described with reference to FIGS. 1 and 6.

The template resource element-to-port mapper 725 may be used to identify a template mapping of a plurality of ports to a first plurality of frequency subcarriers and a first plurality of time periods of a template time-frequency resource grid, as described for example with reference to FIGS. 3 and 4. In some examples, each port of the plurality of ports may be associated with a corresponding RF chain. The template resource element-to-port mapper 725 may additionally or alternatively be used to map a plurality of resource elements of an OFDM time-frequency resource grid to the plurality of ports based at least in part on the template mapping, as described for example with reference to FIGS. 3 and 4. In some examples, the mapping may include mapping each resource element of the plurality of resource elements to a single port of the plurality of ports based at least in part on the template mapping. In some examples, the mapping may include mapping each resource element of the plurality of resource elements to a group of ports of the plurality of ports, based at least in part on an OCC associated with the template mapping, as described with reference to FIG. 5. In some examples, the number of ports in the group of ports may be based at least in part on a length of the OCC. In some examples, the OFDM time-frequency resource grid may include at least one of a second plurality of frequency subcarriers greater in number than the first plurality of frequency subcarriers, a second plurality of time periods greater in number than the first plurality of time periods, or a combination thereof.

The reference signal reception manager 730 may be used to receive one or more reference signals from a second wireless device, on one or more subsets of the plurality of ports, based at least in part on the mapping, as described for example with reference to FIGS. 3 and 4. In some examples, each subset of the plurality of resource elements may be distributed in time and frequency over the OFDM time-frequency resource grid.

The reference signal decoder 735 may be used to decode the reference signal(s) from one or more subsets of the plurality of resource elements based at least in part on the mapping, as described for example with reference to FIGS. 3 and 4.

The transmitter 720 may transmit data or control signals or information (i.e., transmissions) generated by other components of the apparatus 705, some or all of which may be associated with various information channels (e.g., data channels, control channels, etc.). In some examples, the transmitter 720 may be collocated with the receiver 710 in a transceiver. For example, the transmitter 720 and receiver 710 may be an example of aspects of the transceiver 1130 or 1250 described with reference to FIG. 11 or 12. The transmitter 720 may include a single antenna or a set of antennas.

Figure 8:
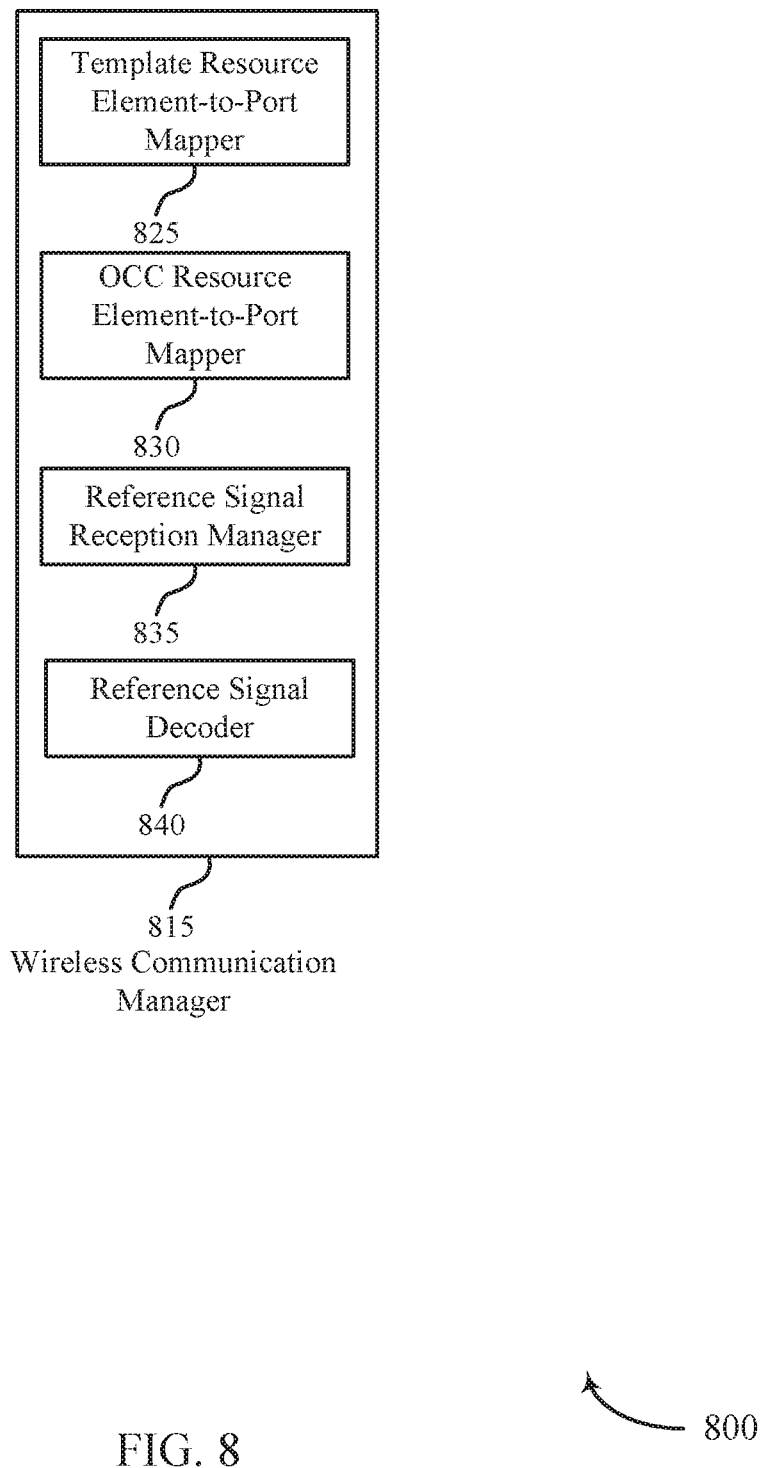
FIG. 8 shows a block diagram of a wireless communication manager, in accordance with various aspects of the present disclosure.

FIG. 8 shows a block diagram 800 of a wireless communication manager 815, in accordance with various aspects of the present disclosure. The wireless communication manager 815 may be an example of aspects of a wireless communication manager included in a UE, as described with reference to FIGS. 1, 6, and 7. The wireless communication manager 815 may include a template resource element-to-port mapper 825, an OCC resource element-to-port mapper 830, a reference signal reception manager 835, and a reference signal decoder 840. Each of these components may communicate, directly or indirectly, with one another (e.g., via one or more buses). The template resource element-to-port mapper 825, reference signal reception manager 835, and reference signal decoder 840 may be configured similarly to, and may perform the functions of, the template resource element-to-port mapper 725, reference signal reception manager 730, and reference signal decoder 735 described with reference to FIG. 7.

The template resource element-to-port mapper 825 may be used to identify a template mapping of a plurality of ports to a first plurality of frequency subcarriers and a first plurality of time periods of a template time-frequency resource grid, as described for example with reference to FIGS. 3 and 4. In some examples, each port of the plurality of ports may be associated with a corresponding RF chain.

The template resource element-to-port mapper 825 may additionally or alternatively be used to map a plurality of resource elements of an OFDM time-frequency resource grid to the plurality of ports based at least in part on the template mapping, as described for example with reference to FIGS. 3 and 4. In some examples, the OFDM time-frequency resource grid may include at least one of a second plurality of frequency subcarriers greater in number than the first plurality of frequency subcarriers, a second plurality of time periods greater in number than the first plurality of time periods, or a combination thereof.

The OCC resource element-to-port mapper 830 may be used to apply an OCC to at least one group of resource elements of the plurality of resource elements, as described for example with reference to FIG. 5. The application of the OCC to a group of resource elements may map each resource element in the group of resource elements to a group of ports, in which the group of ports may have been associated with the group of resource elements by the mapping of the plurality of resource elements to the plurality of ports. In some examples, the number of ports in the group of ports may be based at least in part on a length of the OCC.

The reference signal reception manager 835 may be used to receive one or more reference signals from a second wireless device, on one or more subsets of the plurality of ports, based at least in part on the mapping and the application of the OCC, as described for example with reference to FIGS. 3 and 4. In some examples, each subset of the plurality of resource elements may be distributed in time and frequency over the OFDM time-frequency resource grid.

The reference signal decoder 840 may be used to decode the reference signal(s) from one or more subsets of the plurality of resource elements based at least in part on the mapping, as described for example with reference to FIGS. 3 and 4.

Figure 9:
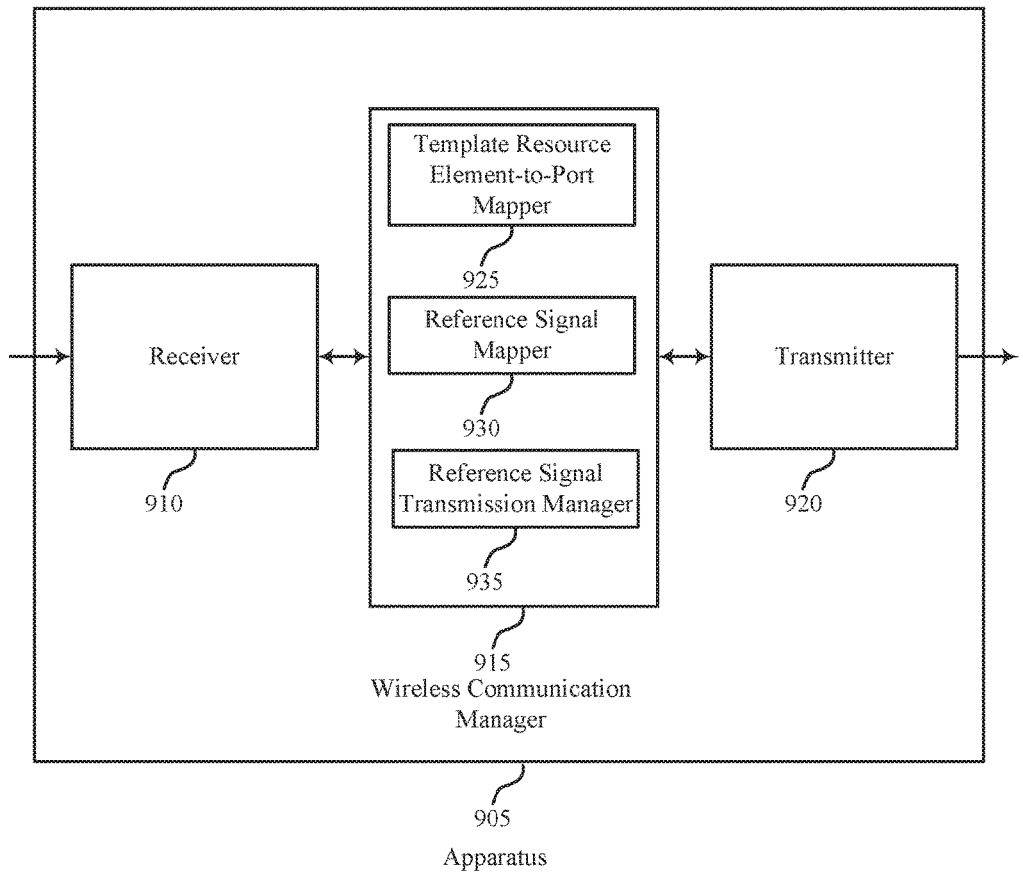
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of a network access device or apparatus described with reference to FIGS. 1, 2, and 6. The apparatus 905 may include a receiver 910, a wireless communication manager 915, and a transmitter 920. The apparatus 905 may also include a processor. Each of these components may be in communication with one another (e.g., via one or more buses).

The receiver 910 may receive data or control signals or information (i.e., transmissions), some or all of which may be associated with various information channels (e.g., data channels, control channels, etc.). Received signals or information, or measurements performed thereon, may be passed to other components of the apparatus 905. The receiver 910 may include a single antenna or a set of antennas.

The wireless communication manager 915 may include a template resource element-to-port mapper 925, a reference signal mapper 930, and a reference signal transmission manager 935. The wireless communication manager 915 may be an example of aspects of a wireless communication manager included in a network access device, as described with reference to FIGS. 1 and 6.

The template resource element-to-port mapper 925 may be used to identify a template mapping of a plurality of ports to a first plurality of frequency subcarriers and a first plurality of time periods of a template time-frequency resource grid, as described for example with reference to FIGS. 3 and 4. In some examples, each port of the plurality of ports may be associated with a corresponding RF chain. The template resource element-to-port mapper 925 may additionally or alternatively be used to map a plurality of resource elements of an OFDM time-frequency resource grid to the plurality of ports based at least in part on the template mapping, as described for example with reference to FIGS. 3 and 4. In some examples, the mapping may include mapping each resource element of the plurality of resource elements to a single port of the plurality of ports based at least in part on the template mapping. In some examples, the mapping may include mapping each resource element of the plurality of resource elements to a group of ports of the plurality of ports, based at least in part on an OCC associated with the template mapping, as described with reference to FIG. 5. In some examples, the number of ports in the group of ports may be based at least in part on a length of the OCC. In some examples, the OFDM time-frequency resource grid may include at least one of a second plurality of frequency subcarriers greater in number than the first plurality of frequency subcarriers, a second plurality of time periods greater in number than the first plurality of time periods, or a combination thereof.

The reference signal mapper 930 may be used to map one or more reference signals to one or more subsets of the plurality of resource elements based at least in part on the mapping of the plurality of resource elements to the plurality of ports, as described for example with reference to FIGS. 3 and 4. In some examples, each subset of the plurality of resource elements may be distributed in time and frequency over the OFDM time-frequency resource grid.

The reference signal transmission manager 935 may be used to transmit the mapped reference signal(s) to at least a second wireless device, from one or more subsets of the plurality of ports, based at least in part on the mapping of the plurality of resource elements to the plurality of ports and the mapping of the reference signal to the subset of the plurality of resource elements, as described for example with reference to FIGS. 3 and 4.

The transmitter 920 may transmit data or control signals or information (i.e., transmissions) generated by other components of the apparatus 905, some or all of which may be associated with various information channels (e.g., data channels, control channels, etc.). In some examples, the transmitter 920 may be collocated with the receiver 910 in a transceiver. For example, the transmitter 920 and receiver 910 may be an example of aspects of the transceiver 1130 or 1250 described with reference to FIG. 11 or 12. The transmitter 920 may include a single antenna or a set of antennas.

Figure 10:
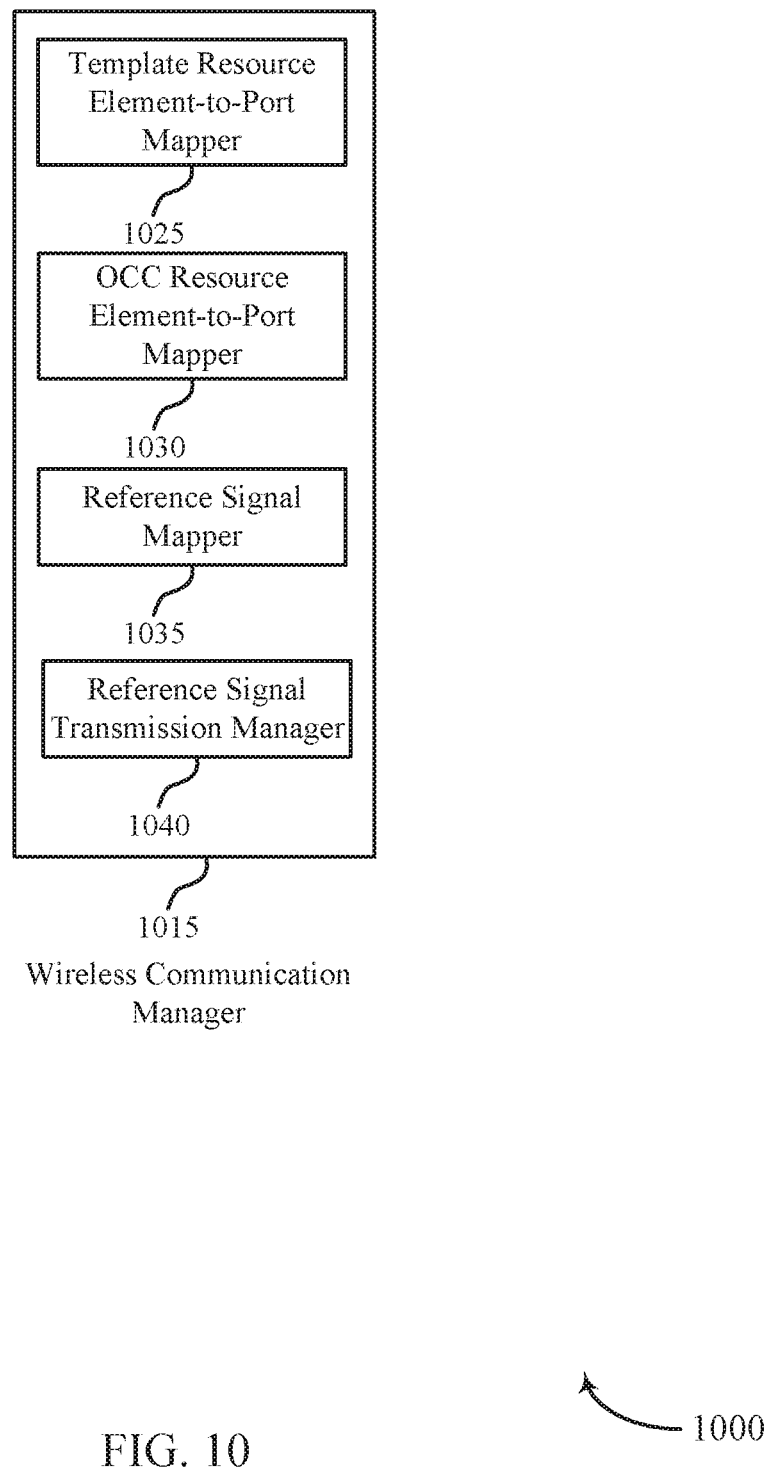
FIG. 10 shows a block diagram of a wireless communication manager, in accordance with various aspects of the present disclosure.

FIG. 10 shows a block diagram 1000 of a wireless communication manager 1015, in accordance with various aspects of the present disclosure. The wireless communication manager 1015 may be an example of aspects of a wireless communication manager included in a UE, as described with reference to FIGS. 1, 6, and 9. The wireless communication manager 1015 may include a template resource element-to-port mapper 1025, an OCC resource element-to-port mapper 1030, a reference signal mapper 1035, and a reference signal transmission manager 1040. Each of these components may communicate, directly or indirectly, with one another (e.g., via one or more buses). The template resource element-to-port mapper 1025, reference signal mapper 1035, and reference signal transmission manager 1040 may be configured similarly to, and may perform the functions of, the template resource element-to-port mapper 925, reference signal mapper 930, and reference signal transmission manager 935 described with reference to FIG. 9.

The template resource element-to-port mapper 1025 may be used to identify a template mapping of a plurality of ports to a first plurality of frequency subcarriers and a first plurality of time periods of a template time-frequency resource grid, as described for example with reference to FIGS. 3 and 4. In some examples, each port of the plurality of ports may be associated with a corresponding RF chain. The template resource element-to-port mapper 1025 may additionally or alternatively be used to map a plurality of resource elements of an OFDM time-frequency resource grid to the plurality of ports based at least in part on the template mapping, as described for example with reference to FIGS. 3 and 4. In some examples, the OFDM time-frequency resource grid may include at least one of a second plurality of frequency subcarriers greater in number than the first plurality of frequency subcarriers, a second plurality of time periods greater in number than the first plurality of time periods, or a combination thereof.

The OCC resource element-to-port mapper 1030 may be used to apply an OCC to at least one group of resource elements of the plurality of resource elements, as described for example with reference to FIG. 5. The application of the OCC to a group of resource elements may map each resource element in the group of resource elements to a group of ports, in which the group of ports may have been associated with the group of resource elements by the mapping of the resource elements to the ports. In some examples, the number of ports in the group of ports may be based at least in part on a length of the OCC.

The reference signal mapper 1035 may be used to map one or more reference signals to one or more subsets of the plurality of resource elements based at least in part on the mapping of the plurality of resource elements to the plurality of ports and the application of the OCC, as described for example with reference to FIGS. 3 and 4. In some examples, each subset of the plurality of resource elements may be distributed in time and frequency over the OFDM time-frequency resource grid.

The reference signal transmission manager 1040 may be used to transmit the mapped reference signal(s) to at least a second wireless device, from one or more subsets of the plurality of ports, based at least in part on the mapping of the plurality of resource elements to the plurality of ports and the mapping of the reference signal to the subset of the plurality of resource elements, as described for example with reference to FIGS. 3 and 4.

Figure 11:
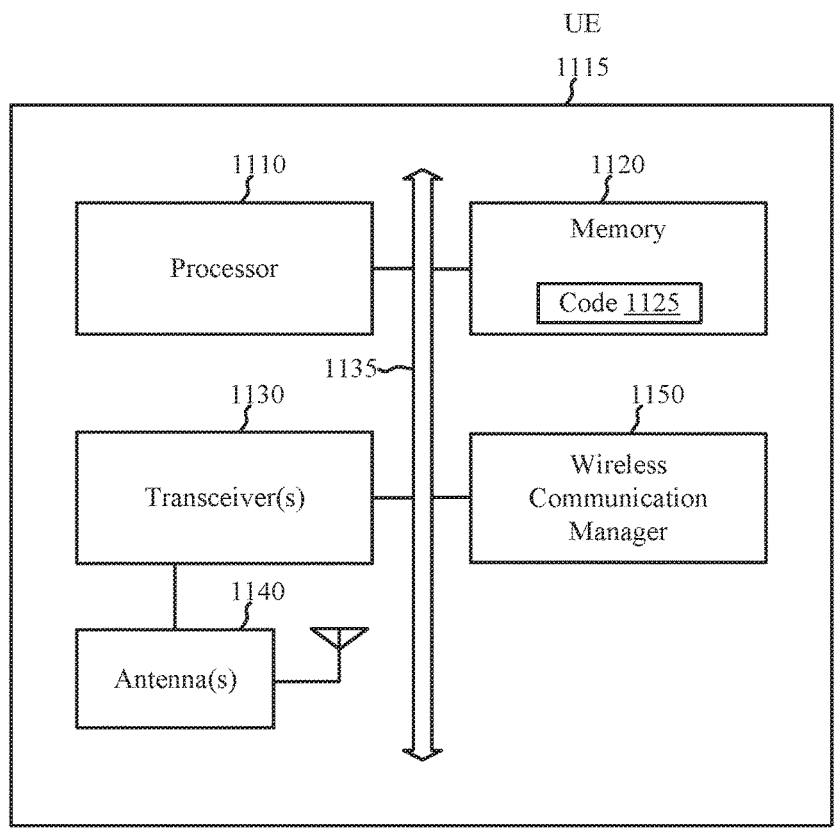
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1115 may, in some examples, have an internal power supply (not shown), such as a small battery, to facilitate mobile operation. In some examples, the UE 1115 may be an example of aspects of one or more of the UEs described with reference to FIGS. 1 and 2, or aspects of one or more of the apparatuses described with reference to FIGS. 6, 7, and 9. The UE 1115 may be configured to implement at least some of the UE or apparatus techniques and functions described with reference to FIGS. 1-10.

The UE 1115 may include a processor 1110, a memory 1120, at least one transceiver (represented by transceiver(s) 1130), antennas 1140 (e.g., an antenna array), or a wireless communication manager 1150. Each of these components may be in communication with each other, directly or indirectly, over one or more buses 1135.

The memory 1120 may include random access memory (RAM) or read-only memory (ROM). The memory 1120 may store computer-readable, computer-executable code 1125 containing instructions that are configured to, when executed, cause the processor 1110 to perform various functions described herein related to wireless communication, including, for example, mapping resource elements to ports based on a template mapping of ports to frequency subcarriers and time periods. Alternatively, the computer-executable code 1125 may not be directly executable by the processor 1110 but be configured to cause the UE 1115 (e.g., when compiled and executed) to perform various of the functions described herein.

The processor 1110 may include an intelligent hardware device, e.g., a central processing unit (CPU), a microcontroller, an ASIC, etc. The processor 1110 may process information received through the transceiver(s) 1130 or information to be sent to the transceiver(s) 1130 for transmission through the antennas 1140. The processor 1110 may handle, alone or in connection with the wireless communication manager 1150, one or more aspects of communicating over (or managing communications over) one or more radio frequency spectrum bands.

The transceiver(s) 1130 may include a modem configured to modulate packets and provide the modulated packets to the antennas 1140 for transmission, and to demodulate packets received from the antennas 1140. The transceiver(s) 1130 may, in some examples, be implemented as one or more transmitters and one or more separate receivers. The transceiver(s) 1130 may support communications in one or more radio frequency spectrum bands. The transceiver(s) 1130 may be configured to communicate bi-directionally, via the antennas 1140, with one or more network access devices or apparatuses, such as one or more of the network access devices described with reference to FIGS. 1 and 2, or one or more of the apparatuses described with reference to FIGS. 6, 7, and 9.

The wireless communication manager 1150 may be configured to perform or control some or all of the UE or apparatus techniques or functions described with reference to FIGS. 1-10 related to wireless communication. The wireless communication manager 1150, or portions of it, may include a processor, or some or all of the functions of the wireless communication manager 1150 may be performed by the processor 1110 or in connection with the processor 1110. In some examples, the wireless communication manager 1150 may be an example of the wireless communication manager described with reference to FIGS. 1 and 6-10.

Figure 12:
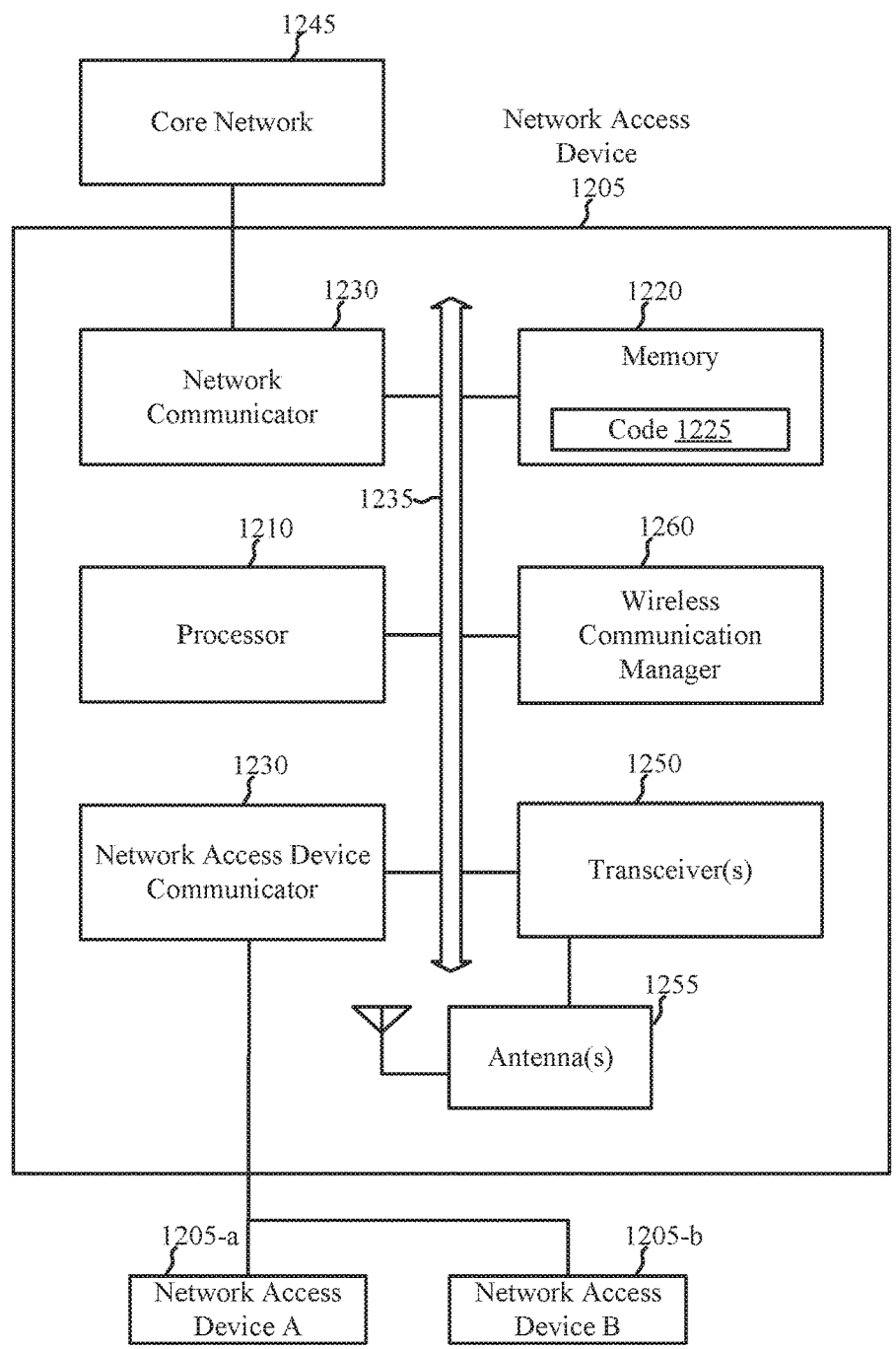
FIG. 12 shows a block diagram of a network access device for use in wireless communication, in accordance with various aspects of the present disclosure.

FIG. 12 shows a block diagram 1200 of a network access device 1205 for use in wireless communication, in accordance with various aspects of the present disclosure. In some examples, the network access device 1205 may be an example of aspects of one or more of the network access devices (e.g., a radio head, a base station, a gNB, or an ANC) described with reference to FIGS. 1 and 2, or aspects of one or more of the apparatuses described with reference to FIGS. 6, 7, and 9. The network access device 1205 may be configured to implement or facilitate at least some of the network access device techniques and functions described with reference to FIGS. 1-10.

The network access device 1205 may include a processor 1210, a memory 1220, at least one transceiver (represented by transceiver(s) 1250), antennas 1255 (e.g., an antenna array), or a wireless communication manager 1260. The network access device 1205 may also include one or more of a network access device communicator 1230 or a network communicator 1240. Each of these components may be in communication with each other, directly or indirectly, over one or more buses 1235.

The memory 1220 may include RAM or ROM. The memory 1220 may store computer-readable, computer-executable code 1225 containing instructions that are configured to, when executed, cause the processor 1210 to perform various functions described herein related to wireless communication, including, for example, mapping resource elements to ports based on a template mapping of ports to frequency subcarriers and time periods. Alternatively, the computer-executable code 1225 may not be directly executable by the processor 1210 but be configured to cause the network access device 1205 (e.g., when compiled and executed) to perform various of the functions described herein.

The processor 1210 may include an intelligent hardware device, e.g., a CPU, a microcontroller, an ASIC, etc. The processor 1210 may process information received through the transceiver(s) 1250, the network access device communicator 1230, or the network communicator 1240. The processor 1210 may also process information to be sent to the transceiver(s) 1250 for transmission through the antennas 1255, or to the network access device communicator 1230 for transmission to one or more other network access devices (e.g., network access device 1205-a and network access device 1205-b), or to the network communicator 1240 for transmission to a core network 1245, which may be an example of one or more aspects of the core network 130 described with reference to FIG. 1. The processor 1210 may handle, alone or in connection with the wireless communication manager 1260, one or more aspects of communicating over (or managing communications over) one or more radio frequency spectrum bands.

The transceiver(s) 1250 may include a modem configured to modulate packets and provide the modulated packets to the antennas 1255 for transmission, and to demodulate packets received from the antennas 1255. The transceiver(s) 1250 may, in some examples, be implemented as one or more transmitters and one or more separate receivers. The transceiver(s) 1250 may support communications in one or more radio frequency spectrum bands. The transceiver(s) 1250 may be configured to communicate bi-directionally, via the antennas 1255, with one or more UEs or apparatuses, such as one or more of the UEs described with reference to FIGS. 1, 2, and 11, or one or more of the apparatuses described with reference to FIGS. 6, 7, and 9. The network access device 1205 may communicate with the core network 1245 through the network communicator 1240. The network access device 1205 may also communicate with other network access devices, such as the network access device 1205-a and the network access device 1205-b, using the network access device communicator 1230.

The wireless communication manager 1260 may be configured to perform or control some or all of the network access device or apparatus techniques or functions described with reference to FIGS. 1-10 related to wireless communication. The wireless communication manager 1260, or portions of it, may include a processor, or some or all of the functions of the wireless communication manager 1260 may be performed by the processor 1210 or in connection with the processor 1210. In some examples, the wireless communication manager 1260 may be an example of the wireless communication manager described with reference to FIGS. 1 and 6-10.

Figure 13:
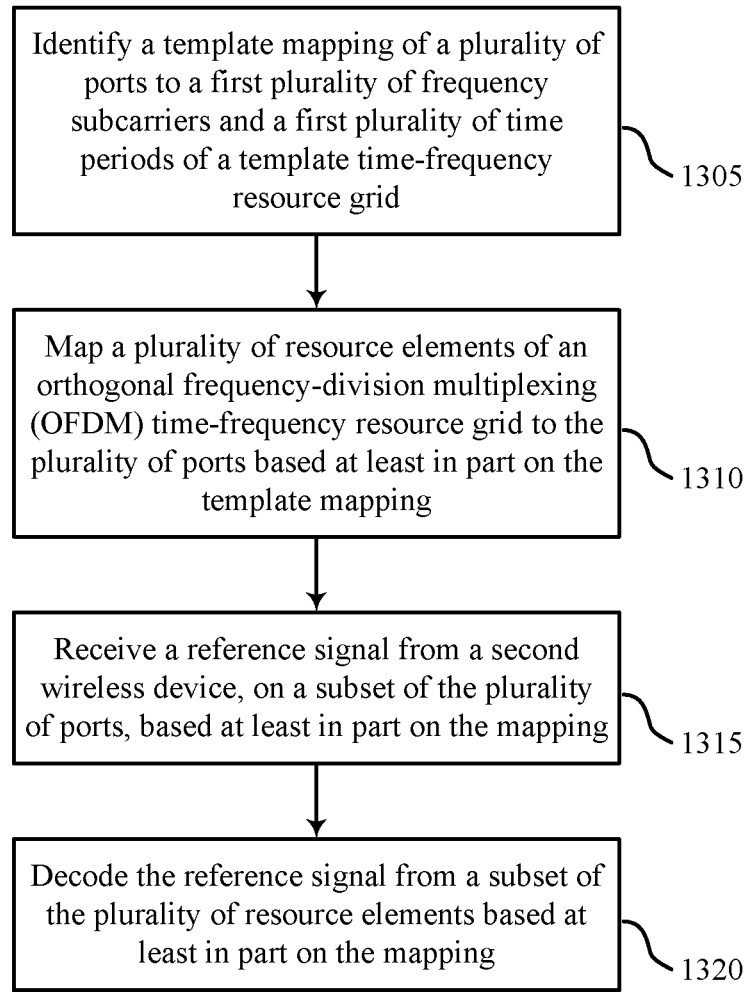
FIGS. 13-18 are flow charts illustrating examples of methods for wireless communications at a wireless device (e.g., a first wireless device), in accordance with various aspects of the present disclosure.

FIG. 13 is a flow chart illustrating an example of a method 1300 for wireless communications at a wireless device (e.g., a first wireless device), in accordance with various aspects of the present disclosure. For clarity, the method 1300 is described below with reference to aspects of one or more of the UEs described with reference to FIGS. 1, 2, and 11, aspects of one or more of the network access devices described with reference to FIGS. 1, 2, and 12, aspects of one or more of the apparatuses described with reference to FIGS. 6 and 7, or aspects of one or more of the wireless communication managers described with reference to FIGS. 1, 6, 7, 8, 11, and 12. In some examples, a first wireless device may execute one or more sets of codes to control the functional elements of the first wireless device to perform the functions described below. Additionally or alternatively, the first wireless device may perform one or more of the functions described below using special-purpose hardware.

At block 1305, the method 1300 may include identifying a template mapping of a plurality of ports to a first plurality of frequency subcarriers and a first plurality of time periods of a template time-frequency resource grid, as described for example with reference to FIGS. 3 and 4. In some examples, each port of the plurality of ports may be associated with a corresponding RF chain. In certain examples, the operation(s) at block 1305 may be performed using the template resource element-to-port mapper described with reference to FIGS. 7 and 8.

At block 1310, the method 1300 may include mapping a plurality of resource elements of an OFDM time-frequency resource grid to the plurality of ports based at least in part on the template mapping, as described for example with reference to FIGS. 3 and 4. In some examples, the mapping may include mapping each resource element of the plurality of resource elements to a single port of the plurality of ports based at least in part on the template mapping. In some examples, the mapping may include mapping each resource element of the plurality of resource elements to a group of ports of the plurality of ports, based at least in part on an OCC associated with the template mapping, as described with reference to FIG. 5. In some examples, the number of ports in the group of ports may be based at least in part on a length of the OCC. In some examples, the OFDM time-frequency resource grid may include at least one of a second plurality of frequency subcarriers greater in number than the first plurality of frequency subcarriers, a second plurality of time periods greater in number than the first plurality of time periods, or a combination thereof. In certain examples, the operation(s) at block 1310 may be performed using the template resource element-to-port mapper described with reference to FIGS. 7 and 8.

At block 1315, the method 1300 may include receiving a reference signal from a second wireless device, on a subset of the plurality of ports, based at least in part on the mapping, as described for example with reference to FIGS. 3 and 4. In some examples, the subset of the plurality of resource elements may be distributed in time and frequency over the OFDM time-frequency resource grid. In certain examples, the operation(s) at block 1315 may be performed using the reference signal reception manager described with reference to FIGS. 7 and 8.

At block 1320, the method 1300 may include decoding the reference signal from a subset of the plurality of resource elements based at least in part on the mapping, as described for example with reference to FIGS. 3 and 4. For example, the decoding may include analog combining of signals associated with the antenna port received at multiple physical antennas to detect the signal energy received via the antenna port. In certain examples, the operation(s) at block 1320 may be performed using the reference signal decoder described with reference to FIGS. 7 and 8.

Figure 14:
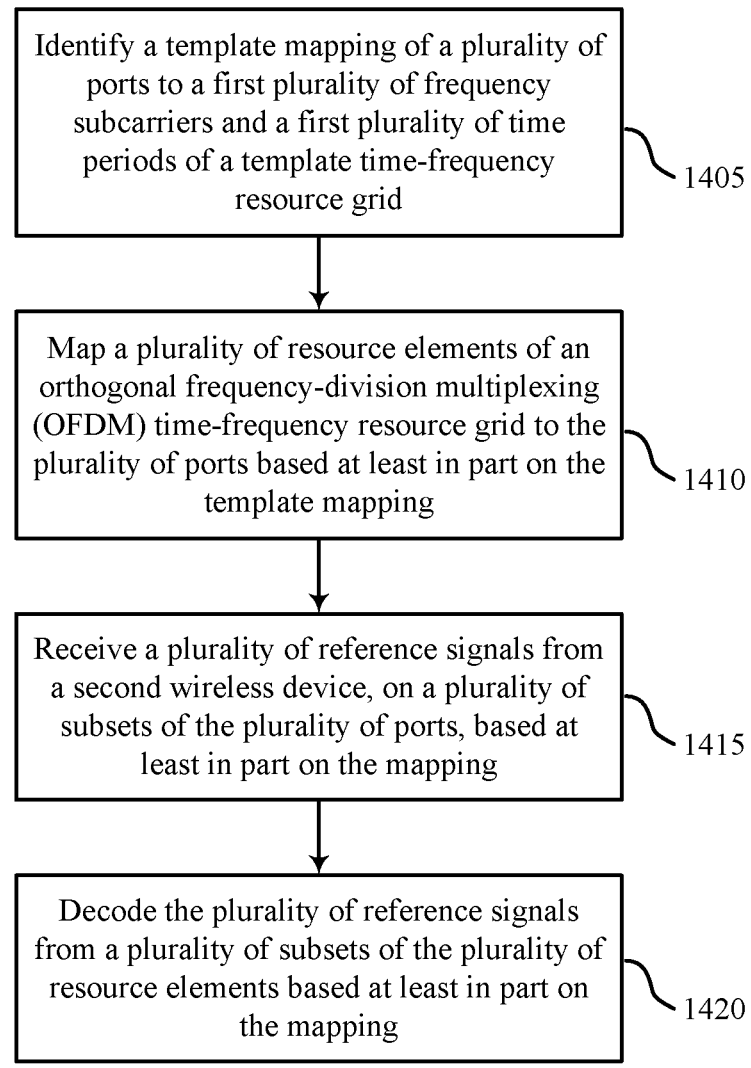

FIG. 14 is a flow chart illustrating an example of a method 1400 for wireless communications at a wireless device (e.g., a first wireless device), in accordance with one or more aspects of the present disclosure. For clarity, the method 1400 is described below with reference to aspects of one or more of the UEs described with reference to FIGS. 1, 2, and 11, aspects of one or more of the network access devices described with reference to FIGS. 1, 2, and 12, aspects of one or more of the apparatuses described with reference to FIGS. 6 and 7, or aspects of one or more of the wireless communication managers described with reference to FIGS. 1, 6, 7, 8, 11, and 12. In some examples, a first wireless device may execute one or more sets of codes to control the functional elements of the first wireless device to perform the functions described below. Additionally or alternatively, the first wireless device may perform one or more of the functions described below using special-purpose hardware.

At block 1405, the method 1400 may include identifying a template mapping of a plurality of ports to a first plurality of frequency subcarriers and a first plurality of time periods of a template time-frequency resource grid, as described for example with reference to FIGS. 3 and 4. In some examples, each port of the plurality of ports may be associated with a corresponding RF chain. In certain examples, the operation(s) at block 1405 may be performed using the template resource element-to-port mapper described with reference to FIGS. 7 and 8.

At block 1410, the method 1400 may include mapping a plurality of resource elements of an OFDM time-frequency resource grid to the plurality of ports based at least in part on the template mapping, as described for example with reference to FIGS. 3 and 4. In some examples, the mapping may include mapping each resource element of the plurality of resource elements to a single port of the plurality of ports based at least in part on the template mapping. In some examples, the mapping may include mapping each resource element of the plurality of resource elements to a group of ports of the plurality of ports, based at least in part on an OCC associated with the template mapping, as described with reference to FIG. 5. In some examples, the number of ports in the group of ports may be based at least in part on a length of the OCC. In some examples, the OFDM time-frequency resource grid may include at least one of a second plurality of frequency subcarriers greater in number than the first plurality of frequency subcarriers, a second plurality of time periods greater in number than the first plurality of time periods, or a combination thereof. In certain examples, the operation(s) at block 1410 may be performed using the template resource element-to-port mapper described with reference to FIGS. 7 and 8.

At block 1415, the method 1400 may include receiving a plurality of reference signals from a second wireless device, on a plurality of subsets of the plurality of ports, based at least in part on the mapping, as described for example with reference to FIGS. 3 and 4. In some examples, each subset of the plurality of resource elements may be distributed in time and frequency over the OFDM time-frequency resource grid. In some examples, the plurality of reference signals may be received using a receive beam sweep in time and frequency. In certain examples, the operation(s) at block 1415 may be performed using the reference signal reception manager described with reference to FIGS. 7 and 8.

At block 1420, the method 1400 may include decoding the plurality of reference signals from a plurality of subsets of the plurality of resource elements based at least in part on the mapping, as described for example with reference to FIGS. 3 and 4. In certain examples, the operation(s) at block 1420 may be performed using the reference signal decoder described with reference to FIGS. 7 and 8.

Figure 15:
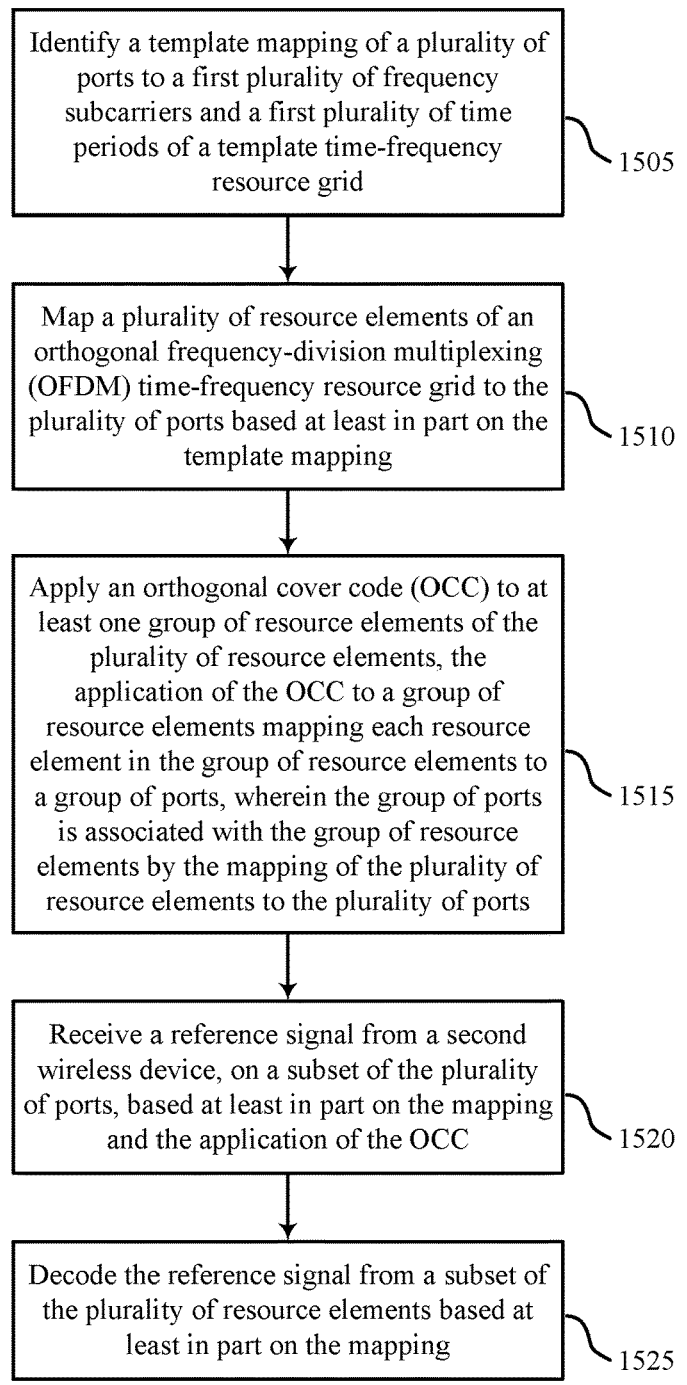

FIG. 15 is a flow chart illustrating an example of a method 1500 for wireless communications at a wireless device (e.g., a first wireless device), in accordance with one or more aspects of the present disclosure. For clarity, the method 1500 is described below with reference to aspects of one or more of the UEs described with reference to FIGS. 1, 2, and 11, aspects of one or more of the network access devices described with reference to FIGS. 1, 2, and 12, aspects of one or more of the apparatuses described with reference to FIGS. 6 and 7, or aspects of one or more of the wireless communication managers described with reference to FIGS. 1, 6, 7, 8, 11, and 12. In some examples, a first wireless device may execute one or more sets of codes to control the functional elements of the first wireless device to perform the functions described below. Additionally or alternatively, the first wireless device may perform one or more of the functions described below using special-purpose hardware.

At block 1505, the method 1500 may include identifying a template mapping of a plurality of ports to a first plurality of frequency subcarriers and a first plurality of time periods of a template time-frequency resource grid, as described for example with reference to FIGS. 3 and 4. In some examples, each port of the plurality of ports may be associated with a corresponding RF chain. In certain examples, the operation(s) at block 1505 may be performed using the template resource element-to-port mapper described with reference to FIGS. 7 and 8.

At block 1510, the method 1500 may include mapping a plurality of resource elements of an OFDM time-frequency resource grid to the plurality of ports based at least in part on the template mapping, as described for example with reference to FIGS. 3 and 4. In some examples, the OFDM time-frequency resource grid may include at least one of a second plurality of frequency subcarriers greater in number than the first plurality of frequency subcarriers, a second plurality of time periods greater in number than the first plurality of time periods, or a combination thereof. In certain examples, the operation(s) at block 1510 may be performed using the template resource element-to-port mapper described with reference to FIGS. 7 and 8.

At block 1515, the method 1500 may include applying an OCC to at least one group of resource elements of the plurality of resource elements, as described for example with reference to FIG. 5. The application of the OCC to a group of resource elements may map each resource element in the group of resource elements to a group of ports, in which the group of ports may have been associated with the group of resource elements by the mapping of the plurality of resource elements to the plurality of ports. In some examples, the number of ports in the group of ports may be based at least in part on a length of the OCC. In certain examples, the operation(s) at block 1515 may be performed using the OCC resource element-to-port mapper described with reference to FIG. 8.

At block 1520, the method 1500 may include receiving a reference signal from a second wireless device, on a subset of the plurality of ports, based at least in part on the mapping and the application of the OCC, as described for example with reference to FIGS. 3 and 4. In some examples, the subset of the plurality of resource elements may be distributed in time and frequency over the OFDM time-frequency resource grid. In certain examples, the operation(s) at block 1520 may be performed using the reference signal reception manager described with reference to FIGS. 7 and 8.

At block 1525, the method 1500 may include decoding the reference signal from a subset of the plurality of resource elements based at least in part on the mapping, as described for example with reference to FIGS. 3 and 4. In certain examples, the operation(s) at block 1525 may be performed using the reference signal decoder described with reference to FIGS. 7 and 8.

Figure 16:
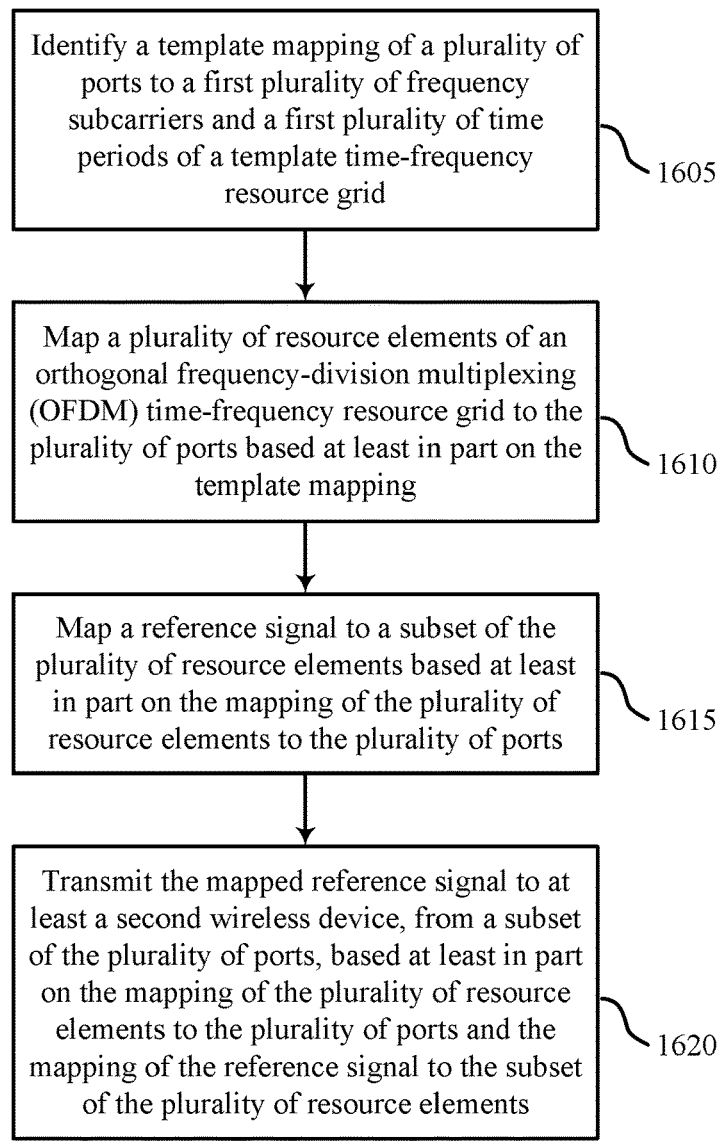

FIG. 16 is a flow chart illustrating an example of a method 1600 for wireless communications at a wireless device (e.g., a first wireless device), in accordance with one or more aspects of the present disclosure. For clarity, the method 1600 is described below with reference to aspects of one or more of the UEs described with reference to FIGS. 1, 2, and 11, aspects of one or more of the network access devices described with reference to FIGS. 1, 2, and 12, aspects of one or more of the apparatuses described with reference to FIGS. 6 and 7, or aspects of one or more of the wireless communication managers described with reference to FIGS. 1, 6, 7, 8, 11, and 12. In some examples, a first wireless device may execute one or more sets of codes to control the functional elements of the first wireless device to perform the functions described below. Additionally or alternatively, the first wireless device may perform one or more of the functions described below using special-purpose hardware.

At block 1605, the method 1600 may include identifying a template mapping of a plurality of ports to a first plurality of frequency subcarriers and a first plurality of time periods of a template time-frequency resource grid, as described for example with reference to FIGS. 3 and 4. In some examples, each port of the plurality of ports may be associated with a corresponding RF chain. In certain examples, the operation(s) at block 1605 may be performed using the template resource element-to-port mapper described with reference to FIGS. 9 and 10.

At block 1610, the method 1600 may include mapping a plurality of resource elements of an OFDM time-frequency resource grid to the plurality of ports based at least in part on the template mapping, as described for example with reference to FIGS. 3 and 4. In some examples, the mapping of the plurality of resource elements to the plurality of ports may include mapping each resource element of the plurality of resource elements to a single port of the plurality of ports based at least in part on the template mapping. In some examples, the mapping of the plurality of resource elements to the plurality of ports may include mapping each resource element of the plurality of resource elements to a group of ports of the plurality of ports, based at least in part on an OCC associated with the template mapping, as described with reference to FIG. 5. In some examples, the number of ports in the group of ports may be based at least in part on a length of the OCC. In some examples, the OFDM time-frequency resource grid may include at least one of a second plurality of frequency subcarriers greater in number than the first plurality of frequency subcarriers, a second plurality of time periods greater in number than the first plurality of time periods, or a combination thereof. In certain examples, the operation(s) at block 1610 may be performed using the template resource element-to-port mapper described with reference to FIGS. 9 and 10.

At block 1615, the method 1600 may include mapping a reference signal to a subset of the plurality of resource elements based at least in part on the mapping of the plurality of resource elements to the plurality of ports, as described for example with reference to FIGS. 3 and 4. In some examples, the subset of the plurality of resource elements may be distributed in time and frequency over the OFDM time-frequency resource grid. In certain examples, the operation(s) at block 1615 may be performed using the reference signal mapper described with reference to FIGS. 9 and 10.

At block 1620, the method 1600 may include transmitting the mapped reference signal to at least a second wireless device, from a subset of the plurality of ports, based at least in part on the mapping of the plurality of resource elements to the plurality of ports and the mapping of the reference signal to the subset of the plurality of resource elements, as described for example with reference to FIGS. 3 and 4. In certain examples, the operation(s) at block 1620 may be performed using the reference signal transmission manager described with reference to FIGS. 9 and 10.

Figure 17:
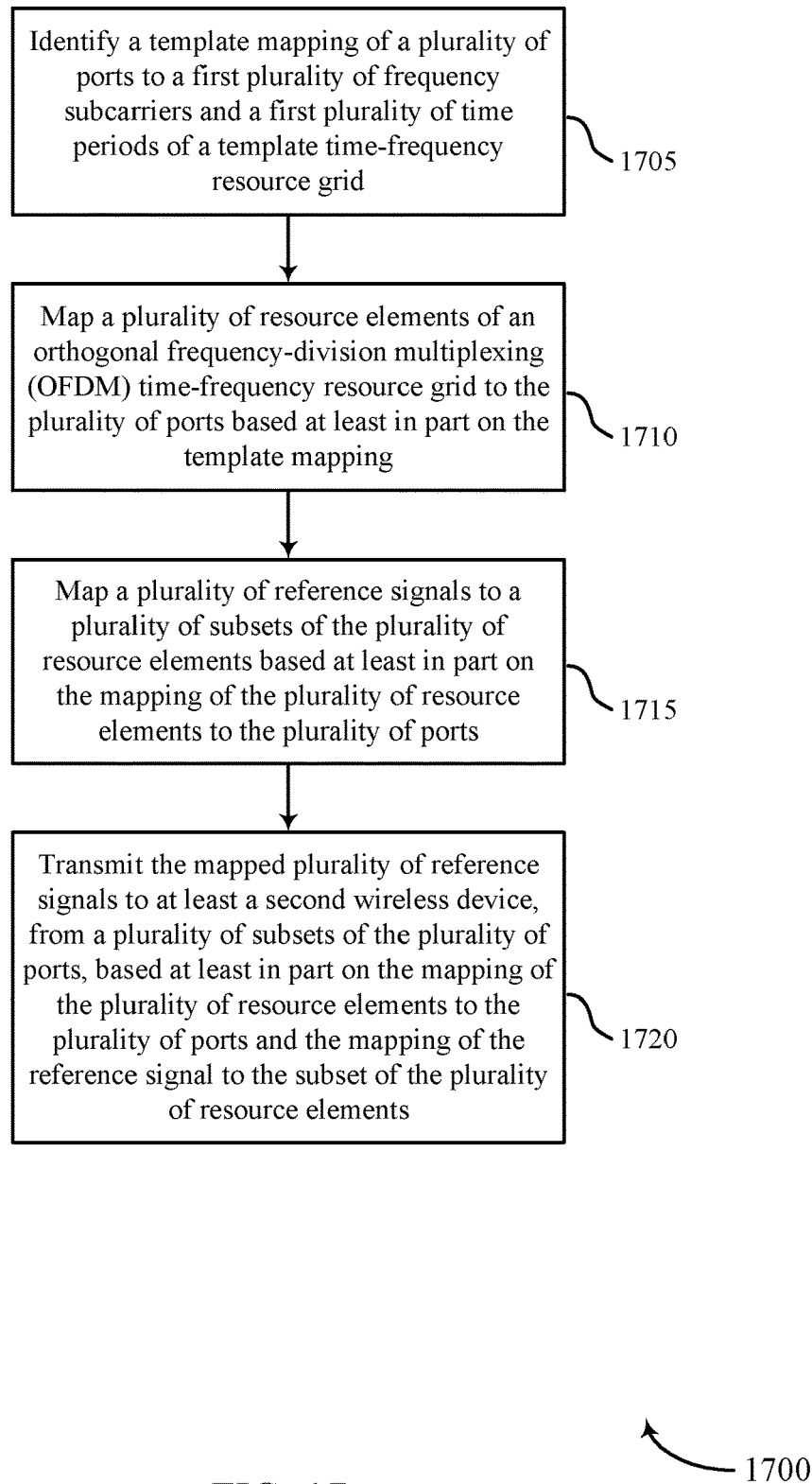

FIG. 17 is a flow chart illustrating an example of a method 1700 for wireless communications at a wireless device (e.g., a first wireless device), in accordance with one or more aspects of the present disclosure. For clarity, the method 1700 is described below with reference to aspects of one or more of the UEs described with reference to FIGS. 1, 2, and 11, aspects of one or more of the network access devices described with reference to FIGS. 1, 2, and 12, aspects of one or more of the apparatuses described with reference to FIGS. 6 and 7, or aspects of one or more of the wireless communication managers described with reference to FIGS. 1, 6, 7, 8, 11, and 12. In some examples, a first wireless device may execute one or more sets of codes to control the functional elements of the first wireless device to perform the functions described below. Additionally or alternatively, the first wireless device may perform one or more of the functions described below using special-purpose hardware.

At block 1705, the method 1700 may include identifying a template mapping of a plurality of ports to a first plurality of frequency subcarriers and a first plurality of time periods of a template time-frequency resource grid, as described for example with reference to FIGS. 3 and 4. In some examples, each port of the plurality of ports may be associated with a corresponding RF chain. In certain examples, the operation(s) at block 1705 may be performed using the template resource element-to-port mapper described with reference to FIGS. 9 and 10.

At block 1710, the method 1700 may include mapping a plurality of resource elements of an OFDM time-frequency resource grid to the plurality of ports based at least in part on the template mapping, as described for example with reference to FIGS. 3 and 4. In some examples, the mapping of the plurality of resource elements to the plurality of ports may include mapping each resource element of the plurality of resource elements to a single port of the plurality of ports based at least in part on the template mapping. In some examples, the mapping of the plurality of resource elements to the plurality of ports may include mapping each resource element of the plurality of resource elements to a group of ports of the plurality of ports, based at least in part on an OCC associated with the template mapping, as described with reference to FIG. 5. In some examples, the number of ports in the group of ports may be based at least in part on a length of the OCC. In some examples, the OFDM time-frequency resource grid may include at least one of a second plurality of frequency subcarriers greater in number than the first plurality of frequency subcarriers, a second plurality of time periods greater in number than the first plurality of time periods, or a combination thereof. In certain examples, the operation(s) at block 1710 may be performed using the template resource element-to-port mapper described with reference to FIGS. 9 and 10.

At block 1715, the method 1700 may include mapping a plurality of reference signals to a plurality of subsets of the plurality of resource elements based at least in part on the mapping of the plurality of resource elements to the plurality of ports, as described for example with reference to FIGS. 3 and 4. In some examples, each subset of the plurality of resource elements may be distributed in time and frequency over the OFDM time-frequency resource grid. In certain examples, the operation(s) at block 1715 may be performed using the reference signal mapper described with reference to FIGS. 9 and 10.

At block 1720, the method 1700 may include transmitting the mapped plurality of reference signals to at least a second wireless device, from a plurality of subsets of the plurality of ports, based at least in part on the mapping of the plurality of resource elements to the plurality of ports and the mapping of the reference signal to the subset of the plurality of resource elements, as described for example with reference to FIGS. 3 and 4. In some examples, the mapped plurality of reference signals may be transmitted using a transmit beam sweep in time and frequency. In certain examples, the operation(s) at block 1720 may be performed using the reference signal transmission manager described with reference to FIGS. 9 and 10.

Figure 18:
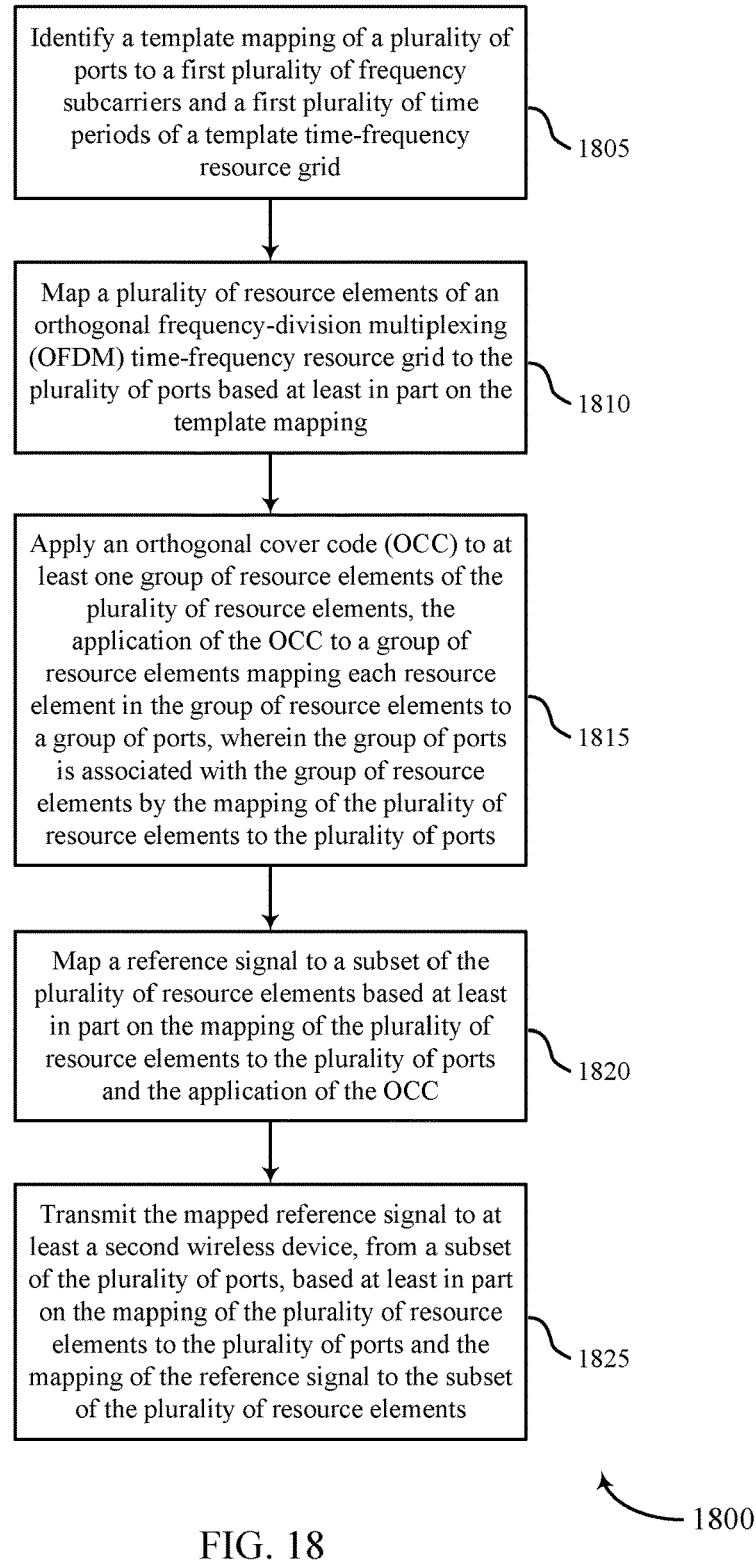

FIG. 18 is a flow chart illustrating an example of a method 1800 for wireless communications at a wireless device (e.g., a first wireless device), in accordance with one or more aspects of the present disclosure. For clarity, the method 1800 is described below with reference to aspects of one or more of the UEs described with reference to FIGS. 1, 2, and 11, aspects of one or more of the network access devices described with reference to FIGS. 1, 2, and 12, aspects of one or more of the apparatuses described with reference to FIGS. 6 and 7, or aspects of one or more of the wireless communication managers described with reference to FIGS. 1, 6, 7, 8, 11, and 12. In some examples, a first wireless device may execute one or more sets of codes to control the functional elements of the first wireless device to perform the functions described below. Additionally or alternatively, the first wireless device may perform one or more of the functions described below using special-purpose hardware.

At block 1805, the method 1800 may include identifying a template mapping of a plurality of ports to a first plurality of frequency subcarriers and a first plurality of time periods of a template time-frequency resource grid, as described for example with reference to FIGS. 3 and 4. In some examples, each port of the plurality of ports may be associated with a corresponding RF chain. In certain examples, the operation(s) at block 1805 may be performed using the template resource element-to-port mapper described with reference to FIGS. 9 and 10.

At block 1810, the method 1800 may include mapping a plurality of resource elements of an OFDM time-frequency resource grid to the plurality of ports based at least in part on the template mapping, as described for example with reference to FIGS. 3 and 4. In some examples, the OFDM time-frequency resource grid may include at least one of a second plurality of frequency subcarriers greater in number than the first plurality of frequency subcarriers, a second plurality of time periods greater in number than the first plurality of time periods, or a combination thereof. In certain examples, the operation(s) at block 1810 may be performed using the template resource element-to-port mapper described with reference to FIGS. 9 and 10.

At block 1815, the method 1800 may include applying an OCC to at least one group of resource elements of the plurality of resource elements, as described for example with reference to FIG. 5. The application of the OCC to a group of resource elements may map each resource element in the group of resource elements to a group of ports, in which the group of ports may have been associated with the group of resource elements by the mapping of the resource elements to the ports. In some examples, the number of ports in the group of ports may be based at least in part on a length of the OCC. In certain examples, the operation(s) at block 1815 may be performed using the OCC resource element-to-port mapper described with reference to FIG. 10.

At block 1820, the method 1800 may include mapping a reference signal to a subset of the plurality of resource elements based at least in part on the mapping of the plurality of resource elements to the plurality of ports and the application of the OCC, as described for example with reference to FIGS. 3-5. In some examples, the subset of the plurality of resource elements may be distributed in time and frequency over the OFDM time-frequency resource grid. In certain examples, the operation(s) at block 1820 may be performed using the reference signal mapper described with reference to FIGS. 9 and 10.

At block 1825, the method 1800 may include transmitting the mapped reference signal to at least a second wireless device, from a subset of the plurality of ports, based at least in part on the mapping of the plurality of resource elements to the plurality of ports and the mapping of the reference signal to the subset of the plurality of resource elements, as described for example with reference to FIGS. 3 and 4. In certain examples, the operation(s) at block 1825 may be performed using the reference signal transmission manager described with reference to FIGS. 9 and 10.

The methods 1300, 1400, 1500, 1600, 1700, and 1800 described with reference to FIGS. 13-18 may provide for wireless communication. It should be noted that the methods described in FIGS. 13-18 are example implementations of some of the techniques described in the present disclosure, and the operations of the methods may be rearranged, combined with other operations of the same or different method(s), or otherwise modified, such that other implementations are possible. Operations may also be added to the methods.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method of wireless communications at a first wireless device, comprising:
   identifying a template mapping of a plurality of ports to a first plurality of frequency subcarriers and a first plurality of time periods of a template time-frequency resource grid;
   mapping a plurality of resource elements of an orthogonal frequency-division multiplexing (OFDM) time-frequency resource grid to the plurality of ports based at least in part on the template mapping;
   receiving, based at least in part on the mapping, a composite beam within a single symbol period via a single radio frequency (RF) chain associated with a single port of the plurality of ports, the composite beam comprising a reference signal transmitted over a plurality of beams from a second wireless device; and
   decoding the reference signal from a subset of the plurality of resource elements based at least in part on the template mapping.

2. The method of claim 1, further comprising:
   receiving a plurality of reference signals, including the reference signal, from the second wireless device, on a plurality of subsets of the plurality of ports, based at least in part on the mapping.

3. The method of claim 1, wherein the subset of the plurality of resource elements is distributed in time and frequency over the OFDM time-frequency resource grid.

4. The method of claim 3, wherein the mapping comprises:
   mapping each resource element of the plurality of resource elements to a group of ports of the plurality of ports, based at least in part on an orthogonal cover code (OCC) associated with the template mapping.

5. The method of claim 4, wherein a number of ports in the group of ports is based at least in part on a length of the OCC.

6. The method of claim 1, further comprising:
   applying an orthogonal cover code (OCC) to at least one group of resource elements of the plurality of resource elements, the application of the OCC to a group of resource elements mapping each resource element in the group of resource elements to a group of ports, wherein the group of ports is associated with the group of resource elements by the mapping of the plurality of resource elements to the plurality of ports.

7. The method of claim 1, wherein the OFDM time-frequency resource grid includes at least one of:
   a second plurality of frequency subcarriers greater in number than the first plurality of frequency subcarriers, a second plurality of time periods greater in number than the first plurality of time periods, or a combination thereof.

8. An apparatus for wireless communications at a first wireless device, comprising:
   a processor;
   memory in electronic communication with the processor; and
   instructions stored in the memory and operable, when executed by the processor, to cause the apparatus to:
   identify a template mapping of a plurality of ports to a first plurality of frequency subcarriers and a first plurality of time periods of a template time-frequency resource grid;
   map a plurality of resource elements of an orthogonal frequency-division multiplexing (OFDM) time-frequency resource grid to the plurality of ports based at least in part on the template mapping;
   receive, based at least in part on the mapping, a composite beam within a single symbol period via a single radio frequency (RF) chain associated with a single port of the plurality of ports, the composite beam comprising a reference signal transmitted over a plurality of beams from a second wireless device; and
   decode the reference signal from a subset of the plurality of resource elements based at least in part on the template mapping.

9. The apparatus of claim 8, wherein the instructions are executable by the processor to:
receive a plurality of reference signals, including the reference signal, from the second wireless device, on a plurality of subsets of the plurality of ports, based at least in part on the mapping.

10. The apparatus of claim 8, wherein the subset of the plurality of resource elements is distributed in time and frequency over the OFDM time-frequency resource grid.

11. The apparatus of claim 10, wherein the instructions executable by the processor to map comprise instructions executable by the processor to:
map each resource element of the plurality of resource elements to a group of ports of the plurality of ports, based at least in part on an orthogonal cover code (OCC) associated with the template mapping.

12. A method of wireless communications at a first wireless device, comprising:
identifying a template mapping of a plurality of ports to a first plurality of frequency subcarriers and a first plurality of time periods of a template time-frequency resource grid;
mapping a plurality of resource elements of an orthogonal frequency-division multiplexing (OFDM) time-frequency resource grid to the plurality of ports based at least in part on the template mapping;
mapping a reference signal associated with a single port of the plurality of ports to a subset of the plurality of resource elements based at least in part on the mapping of the plurality of resource elements to the plurality of ports; and
transmitting, to at least a second wireless device, a composite beam for the reference signal within a single symbol period via a single radio frequency (RF) chain associated with the single port, the composite beam comprising the reference signal transmitted over a plurality of beams via different resources of the subset of the plurality of resource elements.

13. The method of claim 12, further comprising:
mapping a plurality of reference signals including the reference signal to a plurality of subsets of the plurality of resource elements based at least in part on the mapping of the plurality of resource elements to the plurality of ports.

14. The method of claim 13, further comprising:
transmitting the mapped plurality of reference signals to at least the second wireless device, from a plurality of subsets of the plurality of ports, based at least in part on the mapping of the plurality of resource elements to the plurality of ports and the mapping of the reference signal to the subset of the plurality of resource elements.

15. The method of claim 14, wherein the subset of the plurality of resource elements is distributed in time and frequency over the OFDM time-frequency resource grid.

16. The method of claim 15, wherein the mapping of the plurality of resource elements to the plurality of ports comprises:
mapping each resource element of the plurality of resource elements to a group of ports of the plurality of ports, based at least in part on an orthogonal cover code (OCC) associated with the template mapping.

17. The method of claim 16, wherein a number of ports in the group of ports is based at least in part on a length of the OCC.

18. The method of claim 12, further comprising:
applying an orthogonal cover code (OCC) to at least one group of resource elements of the plurality of resource elements, the application of the OCC to a group of resource elements mapping each resource element in the group of resource elements to a group of ports, wherein the group of ports is associated with the group of resource elements by the mapping of the plurality of resource elements to the plurality of ports.

19. The method of claim 12, wherein the OFDM time-frequency resource grid includes at least one of:
a second plurality of frequency subcarriers greater in number than the first plurality of frequency subcarriers, a second plurality of time periods greater in number than the first plurality of time periods, or a combination thereof.

20. An apparatus for wireless communications at a first wireless device, comprising:
a processor;
memory in electronic communication with the processor; and
instructions stored in the memory and operable, when executed by the processor, to cause the apparatus to:
identify a template mapping of a plurality of ports to a first plurality of frequency subcarriers and a first plurality of time periods of a template time-frequency resource grid;
map a plurality of resource elements of an orthogonal frequency-division multiplexing (OFDM) time-frequency resource grid to the plurality of ports based at least in part on the template mapping;
map a reference signal associated with a single port of the plurality of ports to a subset of the plurality of resource elements based at least in part on the mapping of the plurality of resource elements to the plurality of ports; and
transmit, to at least a second wireless device, a composite beam for the reference signal within a single symbol period via a single radio frequency (RF) chain associated with the single port, the composite beam comprising the reference signal transmitted over a plurality of beams via different resources of the subset of the plurality of resource elements.

21. The apparatus of claim 20, wherein the instructions are executable by the processor to:
transmit the mapped plurality of reference signals to at least the second wireless device, from a plurality of subsets of the plurality of ports, based at least in part on the mapping of the plurality of resource elements to the plurality of ports and the mapping of the reference signal to the subset of the plurality of resource elements.

22. The apparatus of claim 20, wherein the subset of the plurality of resource elements is distributed in time and frequency over the OFDM time-frequency resource grid.

23. The method of claim 1, wherein identifying the template mapping further comprises:
mapping at least one subset of the plurality of ports in a sequential order to each resource element of the template time-frequency resource grid along a dimension corresponding to the first plurality of frequency subcarriers or the first plurality of time periods.

24. The method of claim 1, wherein a number of subcarriers of the first plurality of frequency subcarriers or a number of time periods of the first plurality of time periods corresponds to a number of RF chains scanning beams associated with the plurality of ports.

25. The method of claim 1, wherein a first subset of the plurality of resource elements of the OFDM time-frequency resource grid mapped to a first port of the subset of the plurality of ports corresponds to a first beam direction and a second subset of the plurality of resource elements of the OFDM time-frequency resource grid mapped to the first port of the subset of the plurality of ports corresponds to a second beam direction.

26. The method of claim 1, wherein decoding the reference signal from the subset of the plurality of resource elements comprises:
   detecting energy of each of the subset of the plurality of ports using a different RF chain of the first wireless device.

27. The apparatus of claim 8, wherein the instructions to identify the template mapping further comprise instructions executable by the processor to:
   map at least one subset of the plurality of ports in a sequential order to each resource element of the template time-frequency resource grid along a dimension corresponding to the first plurality of frequency subcarriers or the first plurality of time periods.

28. The apparatus of claim 8, wherein a number of subcarriers of the first plurality of frequency subcarriers or a number of time periods of the first plurality of time periods corresponds to a number of RF chains scanning beams associated with the plurality of ports.

29. The method of claim 12, wherein identifying the template mapping further comprises:
   mapping at least one subset of the plurality of ports in a sequential order to each resource element of the template time-frequency resource grid along a dimension corresponding to the first plurality of frequency subcarriers or the first plurality of time periods.

30. The method of claim 12, wherein a number of subcarriers of the first plurality of frequency subcarriers or a number of time periods of the first plurality of time periods corresponds to a number of RF chains scanning beams associated with the plurality of ports.

31. The method of claim 1, wherein the template mapping is mapped to contiguous resources within the OFDM time-frequency resource grid.

32. The apparatus of claim 8, wherein the template mapping is mapped to contiguous resources within the OFDM time-frequency resource grid.

33. The method of claim 12, wherein the template mapping is mapped to contiguous resources within the OFDM time-frequency resource grid.

34. The apparatus of claim 20, wherein the template mapping is mapped to contiguous resources within the OFDM time-frequency resource grid.

* * * * *